United States Patent
Ogawa et al.

(10) Patent No.: US 10,024,984 B2
(45) Date of Patent: Jul. 17, 2018

(54) RADIATION DETECTOR, DETECTOR MODULE, AND MEDICAL IMAGE DIAGNOSIS APPARATUS

(71) Applicant: Toshiba Medical Systems Corporation, Otawara-shi (JP)

(72) Inventors: Takayuki Ogawa, Yokohama (JP); Kuniaki Yamamoto, Yokohama (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 57 days.

(21) Appl. No.: 15/262,393

(22) Filed: Sep. 12, 2016

(65) Prior Publication Data

US 2017/0082758 A1    Mar. 23, 2017

(30) Foreign Application Priority Data

Sep. 18, 2015 (JP) .................................. 2015-185905

(51) Int. Cl.
*G01T 1/24* (2006.01)

(52) U.S. Cl.
CPC .............. *G01T 1/244* (2013.01); *G01T 1/243* (2013.01)

(58) Field of Classification Search
CPC .................................. G01T 1/243; G01T 1/244
See application file for complete search history.

(56) References Cited

U.S. PATENT DOCUMENTS

| | | | | |
|---|---|---|---|---|
| 2006/0241386 A1* | 10/2006 | Yanagita | ................. | G01T 1/249 600/415 |
| 2010/0204942 A1* | 8/2010 | Danielsson | ............. | G01T 1/242 702/85 |
| 2013/0101081 A1 | 4/2013 | Yaoi et al. | | |
| 2013/0306877 A1* | 11/2013 | Pohan | ....................... | G01T 7/00 250/394 |
| 2014/0233690 A1 | 8/2014 | Hashimoto et al. | | |

FOREIGN PATENT DOCUMENTS

| | | |
|---|---|---|
| JP | 10-145078 | 5/1998 |
| JP | 2002-299878 | 10/2002 |
| JP | 2003-282849 | 10/2003 |
| JP | 2012-105967 | 6/2012 |
| JP | 2014-62898 | 4/2014 |

* cited by examiner

*Primary Examiner* — Casey Bryant
(74) *Attorney, Agent, or Firm* — Oblon, McClelland, Maier & Neustadt, L.L.P.

(57) ABSTRACT

A radiation detector according to an embodiment includes a plurality of detector modules, a first and second radiation shield, and first supporter. The first radiation shield is provided in a first detector module and is arranged on a side opposite to a surface of a first detector pack of a first detector module on which radiation is incident. The second radiation shield is arranged to intersect with a path of radiation that passes through between a first detector pack and a second detector pack of a second detector module that is arranged adjacently to the first detector module. The first supporter supports the first radiation shield ouch that at least a part of the first radiation shield overlaps the second radiation shield on the path of radiation.

8 Claims, 14 Drawing Sheets

FIG.14
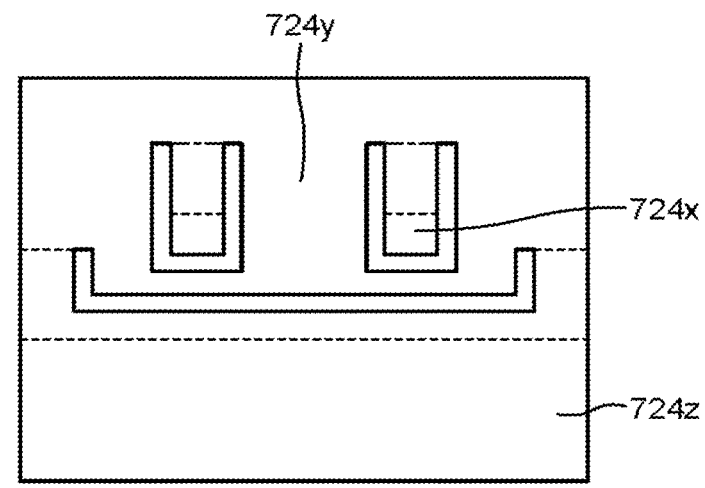
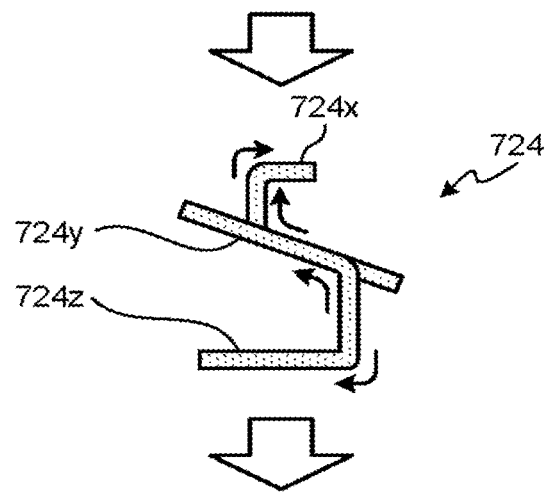
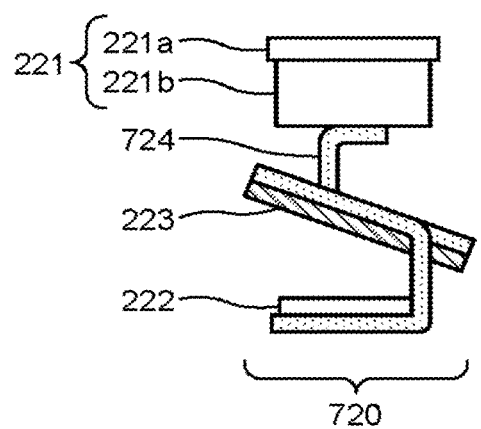

RADIATION DETECTOR, DETECTOR MODULE, AND MEDICAL IMAGE DIAGNOSIS APPARATUS

CROSS-REFERENCE TO RELATED APPLICATIONS

This application is based upon and claims the benefit of priority from Japanese Patent Application No. 2015-185905, filed on Sep. 18, 2015; the entire contents of which are incorporated herein by reference.

FIELD

Embodiments described herein relate generally to a radiation detector, a detector module, and a medical image diagnosis apparatus.

BACKGROUND

Conventionally, medical image diagnosis apparatuses that generate a medical image of a subject by using radiation, such as an X-ray competed tomography (CT) apparatus, a positron emission tomography (PET) apparatus, a single photon emission computed tomography (SPECT) apparatus, and a gamma camera, are known. Such a medical image diagnostic apparatus includes a radiation detector for detecting radiation, such as an X-ray or a y-ray. In general, a radiation detector includes a detector pack including, as a component for detecting radiation, a detection element that detects radiation.

BRIEF DESCRIPTION OF THE DRAWINGS

FIG. 14 is a diagram of an exemplary supporter of a fourth modification of the first embodiment;

DETAILED DESCRIPTION

A radiation detector according to an embodiment includes a plurality of detector modules, a first radiation shield, a second radiation shield, and a first supporter. The detector modules are arranged along a given direction and each of which includes a detector pack including a detection element configured to detect radiation. The first radiation shield is provided in a first detector module among the detector modules and is arranged on a side opposite to a surface of a first detector pack of the first detector module on which the radiation is incident. The second radiation shield is arranged to intersect with a path of radiation that passes through between the first detector pack and a second detector pack of a second detector module that is arranged adjacently to the first detector module. The first supporter is provided in the first detector module and supports the first radiation shield such that at least a part of the first radiation shield overlaps the second radiation shield on the path of radiation.

With reference to the accompanying drawings, embodiments of the radiation detector, the detector module, and the medical image diagnosis apparatus disclosed herein will be described below. An exemplary case where the technology disclosed herein is applied to an X-ray CT apparatus will be described.

First Embodiment

Figure 1:
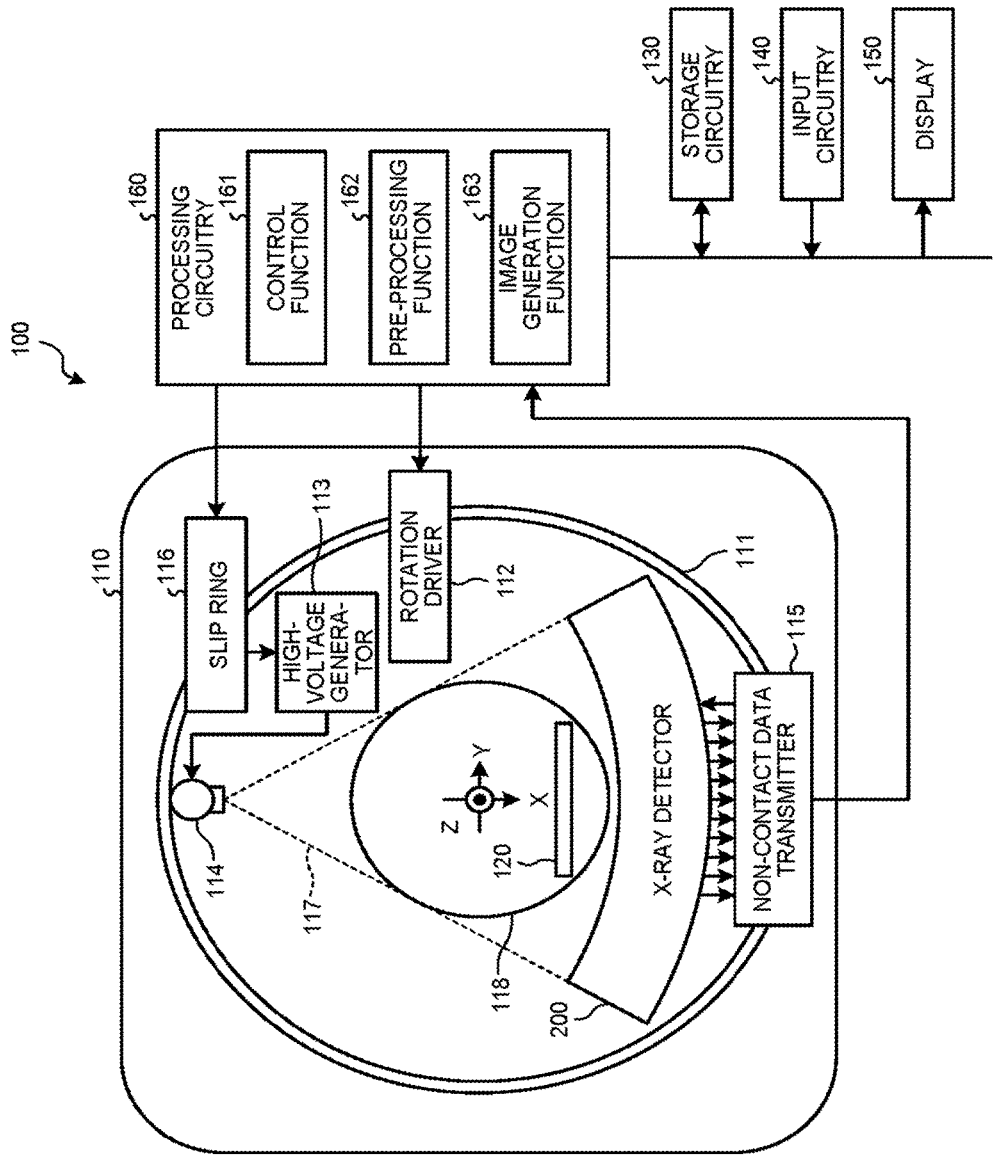
FIG. 1 is a diagram of an exemplary configuration of an X-ray CT apparatus according to a first embodiment.

FIG. 1 is a diagram of an exemplary configuration of an X-ray CT apparatus according to a first embodiment. For example, as shown in FIG. 1, an X-ray CT apparatus 100 according to the first embodiment includes a gantry 110, a couchtop 120, a storage circuitry 130, an input circuitry 140, a display 150, and a processing circuitry 160.

The gantry 110 houses a rotation frame 111, a rotation driver 112, and a rotation support mechanism that includes a frame support mechanism. On the rotation frame 111, a high-voltage generator 113, an X-ray tube 114, an X-ray detector 200, and a non-contact data transmitter 115 are mounted. The rotation support mechanism and the frame support mechanism are not shown in FIG. 1.

The rotation frame 111 is rotatably supported by the frame support mechanism on a Z-axis that is a rotation axis that is set in the X-ray CT apparatus 100. Note that an apparatus coordinate system consisting of the X-axis, a Y-axis, and a Z-axis is set in the X-ray CT apparatus 100. The X-axis is a vertical axis orthogonal to the Z-axis. The Y-axis is an axis orthogonal to the X-axis and the Z-axis.

The rotation driver 112 drives the rotation frame 111 to rotate. For example, the rotation driver 112 is implemented with a motor.

Under the control of the processing circuitry 160, the high-voltage generator 113 generates a tube voltage to be applied to the X-ray tube 114 and a tube current to be supplied to the X-ray tube 114, by using power supplied from the outside of the gantry 110 via a slip ring 116. The high-voltage generator 113 may be set outside the gantry 110. In that case, the high-voltage generator 113 applies the tube voltage to the X-ray tube 114 and supplies the tube current to the X-ray tube 114 via the slip ring 116.

Using the tube voltage applied from the high-voltage generator 113 and the tube current supplied from the high-voltage generator 113, the X-ray tube 114 emits an X-ray from the X-ray focus. Multiple collimator plates are attached to an X-ray emitting window that is provided in front of the X-ray tube 114. The collimator plates form the X-rays emitted from X-ray focus into a corn beam shape (conic shape). FIG. 1 represents the area of X-ray irradiation by dotted lines 117. As the dotted lines 117 represents, the X-ray is emitted to the inside of an opening 116 that is formed around the center of the rotation frame 111 in the gantry 110.

The X-ray detector 200 detects the X-ray that is transmitted through the subject. Specifically, the X-ray detector 200 includes multiple detection elements that detect X-rays. The X-ray detector 200 generates raw data by performing, for example, amplification processing and A/D conversion processing on data of distribution of X-ray intensity that is detected by the detection elements and outputs the generated raw data.

The X-ray detector 200 may be a detector of an indirect conversion type or may be a detector of a direct conversion type. In an X-ray detector of the indirect conversion type, for example, a detection element consists of a scintillator and a photo sensor, such as a photomultiplier tube, and incident X-ray photons are converted by the scintillator into scintillator light and the resultant scintillator light is converted by the photo sensor into an electric signal. In an X-ray detector of the direct conversion type, for example, the detection element consists of a cadmium telluride (CdTe) semiconductor element and incident X-ray photons are converted directly into an electric signal.

Using a non-contact data transmission system using magnetic signals or optical signals, the non-contact data transmitter 115 transmits the raw data that is output from the X-ray detector 200 to a pre-processing function 162.

The sub is placed on the couchtop 120 and the couchtop 120 is moved by a couchtop driver (not shown) along each of the X-axis, the Y-axis, and the X-axis. Under the control of the processing circuitry 160, the couchtop driver moves the couchtop 120 to the inside of the opening 180 that is formed in the gantry 110.

The storage circuitry 130 stores various types of data. For example, the storage circuitry 130 stores a projection data medical image that is generated by the processing circuitry 160. The storage circuitry 130 is implemented with, for example, a semiconductor memory device, such as a random access memory (RAM) or a flash memory, a hard disk, or an optical disk.

The input circuitry 140 accept various input operations from an operator, converts the accepted input operations into electric signals, and transmits the electric signals to the processing circuitry 160. The input circuitry 140 accepts, from the operator, for example, an acquisition condition on acquisition of projection data, a reconstruction condition on reconstruction of a CT image, an image processing condition on generation of a processing image from a CT image, etc. The input circuitry 140 is implemented with, for example, a mouse, a keyboard, a trackball, a switch, a button, or a joy stick.

The display 150 outputs various types of information. The display 150 outputs, for example, a medical image that is generated by the processing circuitry 160 and a graphical user interface (GUI) for accepting various operations from the operator. The display 150 is implemented with, for example, a liquid crystal panel or a cathode ray tube (CRT) monitor.

The processing circuitry 160 controls entire operations of the X-ray CT apparatus 100 in accordance with electronic signals of input operations that are transmitted from the input circuitry 140. For example, the processing circuitry 160 includes the pre-processing function 162, an image generation function 163, and a control function 161. The processing circuitry 160 is implemented with, for example, a processor.

The control function 161 acquires projection data on the subject by controlling, for example, the rotation driver 112, the high-voltage generator 113, and the couchtop driver according to the acquisition condition, which is accepted from the operator via the input circuitry 140.

The pre-processing function 162 generates projection data by performing pre-processing on the raw data, which is transmitted from the non-contact data transmitter 115, and stores the generated projection data in the storage circuitry 130. For example, the pre-processing function 162 performs pre-processing, such as logarithmic conversion processing or offset correction processing, channel-to-channel sensitivity correction processing, and beam-hardening correction.

The image generation function 163 generates a medical image of the subject based on the X-rays that are detected by the X-ray detector 200 and stores the generated medical image in the storage circuitry 130.

Specifically, the image generation function 163 reconstructs a CT image of the subject by performing reconstruction processing on the projection data, which is generated by the pre-processing function 162, according to the reconstruction condition transmitted from the input circuitry 140. For example, the image generation function 163 reconstructs a three-dimensional image (volume data) by using, for example, the Feldkamp method or the cone-beam reconstruction method. Alternatively, for example, the image generation function 163 reconstructs a two-dimensional image (layered image) by performing inverse projection processing, such as the fan-beam reconstruction method or the filtered back projection (FBP) method.

The image generation function 163 generates various processing images by performing various types of image processing on the data of the CT image in accordance with the condition of the image processing condition that is transmitted from the input circuitry 140. For example, the image generation function generates a multi planar reconstruction (MPR) image, a maximum intensity projection (MIP) image, a volume-rendering image, etc.

For example, the control function 161, the pre-processing function 162, and the image generation function 163 are stored in a form of a computer-executable program in the storage circuitry 130. The processing circuitry 160 is a processor that reads each program from the storage circuitry 130 and executes the program to implement the function corresponding to the program. In other words, the processing circuitry 160 that has read the programs corresponding to the respective functions includes the control function 161, the pre-processing function 162, and the image generation function 163 that are shown in the processing circuitry 160 shown in FIG. 1.

FIG. 1 exemplifies and illustrates the case where the control function 161, the pre-processing function 162, and the image generation function 163 of the processing circuitry 160 are implemented by the single processor; however, the first embodiment is not limited to this. For example, the functions of the processing circuitry 160 may be dispersed or integrated as appropriate and implemented by a single or multiple processors.

The word "processor" used in the descriptions provided above refers to, for example, a central processing unit (CPU), a graphics processing unit (GPU), or a circuit, such as an application specific integrated circuit (ASIC) or a programmable logic device (such as a simple programmable logic device (SPLD)), a complex programmable logic device (CPLD), or a field programmable gate array (FPGA)). The processor reads the programs that are saved in the storage circuitry and executes the programs to implement the functions. A configuration may be employed in which, instead of saving the programs in the storage circuitry, the programs are directly incorporated in the circuit of the processor. In this case, the processor reads the programs incorporated in the circuit and executes the read programs to implement the functions. Each processor of the first embodiment is not limited to a case where each processor is configured as a single circuit. Multiple independent processors may be combined to be configured as a single processor to implement the functions of the circuits.

Figure 2:
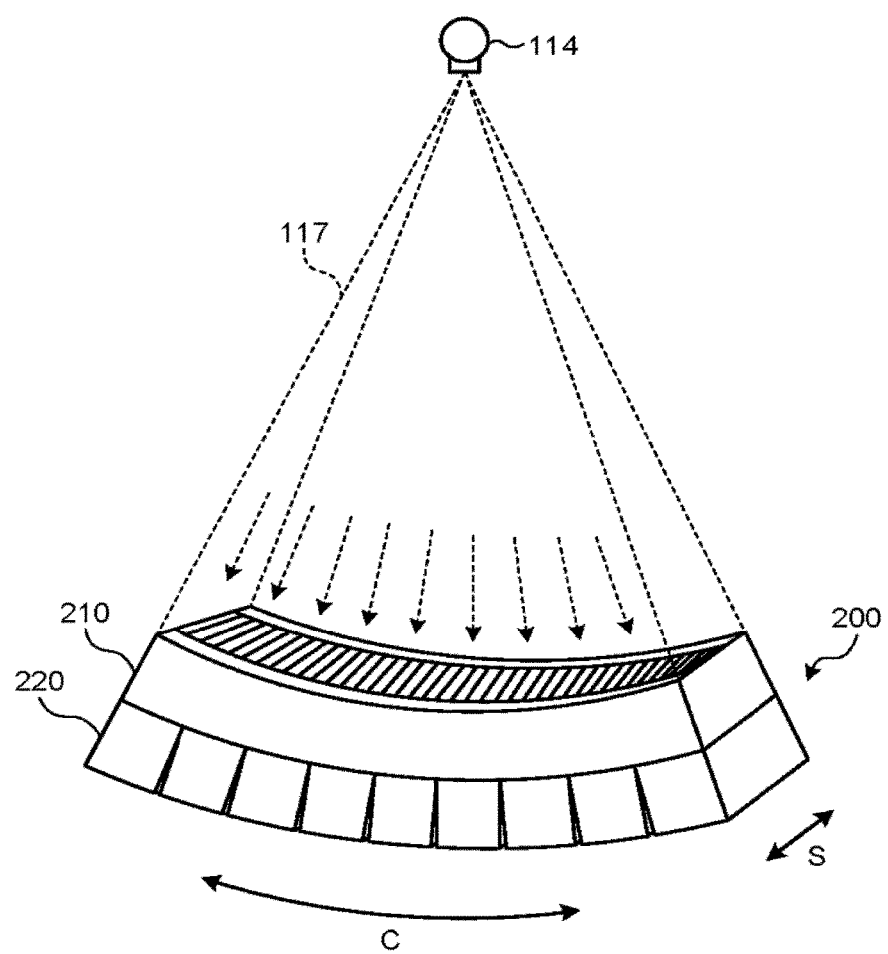
FIG. 2 is a diagram of an exemplary configuration of an X-ray detector according to the first embodiment.

FIG. 2 is a diagram of an exemplary configuration of the X-ray detector 200 according to the first embodiment. For example, as shown in FIG. 2, the X-ray detector 200 includes a collimator unit 210 and a plurality of detector module 220. The direction in which X-rays are emitted is denoted by the dotted arrows. In the following descriptions, the circumferential direction about the X-ray tube 114 is referred to as a channel direction (the direction along the arrow C shown in FIG. 2) and the direction along the Z-axis that is the rotation axis of the above-described rotation frame 111 is referred to as a slice direction (the direction along the arrow S shown in FIG. 2).

The collimator unit 210 removes scattering rays from the X-rays incident on the detector modules 220. Specifically, the collimator unit 210 is formed into an approximately arc shape about the X-ray tube 114 and is arranged in front of each detector module 220 in the direction in which X-rays are emitted. For example, the collimator unit 210 is configured by attaching multiple collimator plates to the supporter that is formed in an arc along the channel direction along the X-ray emission direction.

The detector modules 220 are arranged to be lined along the channel direction on the side of the outer circumference of the collimator unit 10. The detector modules 220 are configured to be replaceable individually. FIG. 2 exemplifies the case where the detector modules 220 are arranged one-dimensionally along the channel direction; however, the first embodiment is not limited to this. For example, the detector modules 220 may be arranged two-dimensionally along the channel direction and the slice direction.

Each of the detector modules 220 includes detector pack and a data acquisition (DAS) board. The detector pack includes a detection element that detects an X-ray. The DAS board generates raw data by performing, for example, amplification processing and A/D conversion processing on data of distribution of X-ray intensity that is detected by the detection element of the detector pack and then outputs the generated raw data.

Modularizing the detector pack and the DAS board as described above enables replacement of a detector pack on a module-by-module basis when, for example, any one of the detector packs fails. Accordingly, it is possible to easily replace a detector pack. The case where a detector pack and a DAS board are modularized is exemplified here; however, the first embodiment is not limited to this. For example, the collimator unit may be divided according to each detector pack to modularize a detector pack, a DAS board, and a collimator unit.

In an X-ray detector used in an X-ray CT apparatus, in general, various structures including an electric board are mounted on an outer side with respect to the detector pack in the X-ray emission direction. Some of these structures cause some effect when X-rays are directly incident on the structures. For this reason, in an X-ray detector that is used in an X-ray CT apparatus, an X-ray shield may be provided between a detector pack and a structure in order to prevent X-rays from being incident on the structure directly.

Figure 3:
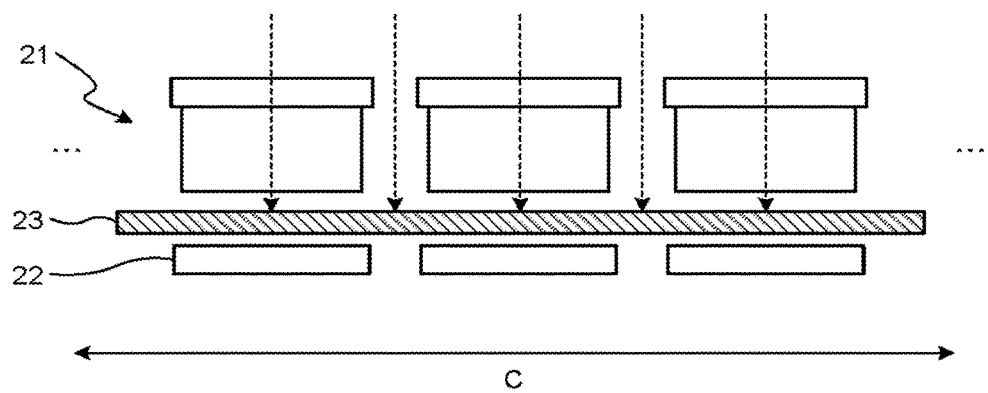
FIG. 3 is a diagram of an exemplary case where an X-ray shield is provided in an X-ray detector.

FIG. 3 is a diagram of an exemplary case where X-ray shields are provided in the X-ray detector. For example, as shown in FIG. 3, in the X-ray detector, a plurality of detector packs 21 are arranged to be lined along the channel direction and a DAS board 22 is arranged on an outer side with respect to each of the detector packs 21 in the X-ray emission direction. FIG. 3 represents the X-ray emission direction by the dotted arrows.

In that case, for example, a uniform X-ray shield that runs along all the detector packs 21 is provided between the detector packs 21 and the GAS boards 22.

In that configuration, in order to replace a detector pack easily as described above, modularizing a detector pack and an X-ray shield by dividing the X-ray shield according to each of the detector packs can be assumed.

Figure 4:
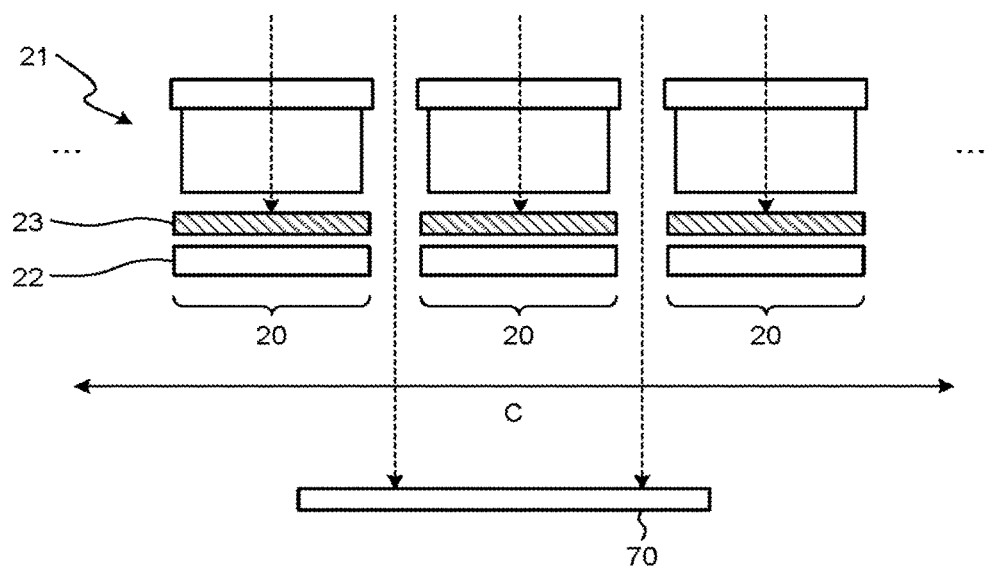
FIG. 4 is a diagram of an exemplary case where a detector pack and the X-ray shield are modularized.

FIG. 4 is a diagram of an exemplary case where a detector pack and an X-ray shield are modularized. For example, as shown in FIG. 4, the X-ray shield 23 is divided according to each of the detector packs 21 and each divided X-ray shield is provided together with its corresponding detector pack 21 in each detector module 20.

Dividing the X-ray shield as described above however causes gaps each between adjacent detector packs 21. For this reason, X-rays having passed through between the detector packs 21 may be directly incident on a structure, such as an electric board 70, that is arranged before the detector modules 20 in the X-ray emission direction.

Under the circumstance, as described below, the detector 200 according to the first embodiment has a configuration that enables easy replacement of a detector pack and prevention of X-rays from being directly incident on a structure, such as an electric board, that is arranged on an outer side with respect to the detector packs in the X-ray emission direction.

Figure 5:
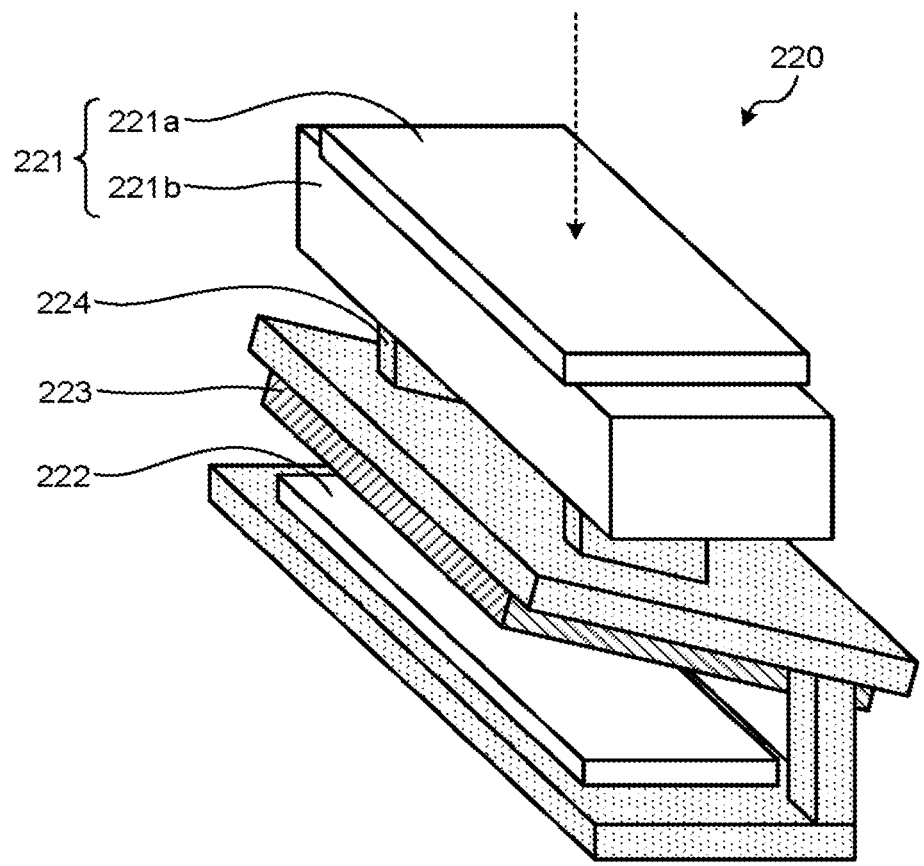
FIG. 5 is a perspective view of an exemplary detector module according to the first embodiment.

FIG. 5 is a perspective view of an exemplary detector module 220 according to the first embodiment. For example, as shown in FIG. 5, the detector module 220 include a detector pack 221, a DAS board 222, an X-ray shield 223, and a supporter 224. In other words, in the first embodiment, the detector pack 221, the DAS board 222, the X-ray shield 223, and the supporter 224 are modularized. The detector modules 220 of the X-ray detector 200 have the same configuration.

The detector pack 221 includes a detection element 221a that detect an X-ray and a plate 221b that supports the detection element.

The DAS board 222 is arranged on an outer side with respect to the detector pack 221 in the X-ray emission direction. In FIG. 5, the X-ray emission direction is represented by the dotted line.

The X-ray shield 223 attenuates X-rays passing through the X-ray shield 223. The X-ray shield 223 is formed of a material enabling attenuation of X-rays. For example, the X-ray shield 223 is formed of a material, such as lead, tungsten, molybdenum, or tantalum.

The supporter 224 supports the detector pack 221, the DAS board 222, and the X-ray shield 223. For example, the a supporter 224 consists of a member that supports the detector pack 221, a member that supports the DAS board 222, and a member that supports the X-ray shield 223, and the supporter 224 is formed by mechanically connecting the members. The supporter 224 is formed of a material having rigidity with which the supporter 224 is able to support the detector pack 221, the DAS board 222, and the X-ray shield 223 while maintaining the relationship among their respective positions. For example, the supporter 224 is formed of a material, for example, metal, such as aluminum or stainless steel, or resin.

Specifically, the supporter 224 supports the X-ray shield 223 such that the X-ray shield 223 is arranged on a side opposite to the surface of the detector pack 221 on which X-rays are incident. Accordingly, the X-ray shield 223 is arranged to intersect with the path of the X-ray passing through the detector pack 221. The X-ray shield 223 is arranged between the detector pack 221 and the DAS board 222.

The case where the detector pack 221, the DAS board 222, the X-ray shield 223, and the supporter 224 are modularized is exemplified here; however, the first embodiment is not limited to this. For example, as described above, the divided collimator unit may be further modularized. Furthermore, for example, the DAS board 222 is not necessarily modularized. In that case, the DAS board 222 is implemented as at least one electric circuit and is connected to the detection element 221a of the detector pack 221 of each detector module 220.

Alternatively, for example, at least one of the detector pack 221, the DAS board 222, and the X-ray shield 223 may be configured to be separable. In that case, for example, the supporter 224 is formed to be separable into the part that supports the detector pack 221, the part that supports the DAS board 222, and the part that supports the X-ray shield 223. This allows independent replacement of one or a plurality of the detector pack 221, the DAS board and the X-ray shield 223.

Figure 6:
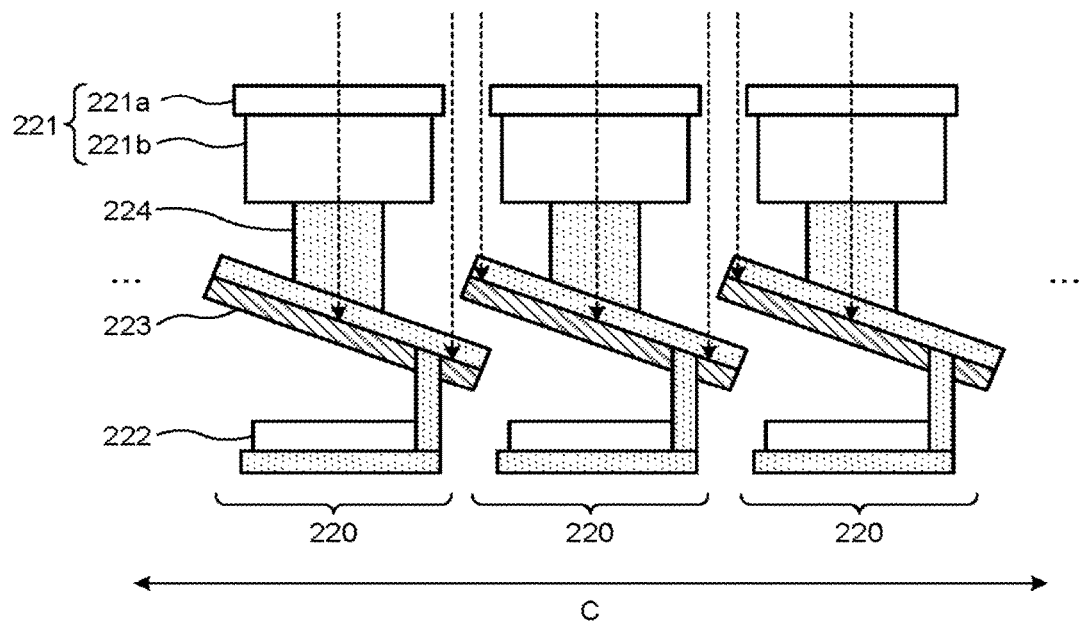
FIG. 6 is a diagram of an exemplary specific configuration of the X-ray detector and the detector module according to the first embodiment.

FIG. 6 is a diagram of an exemplary specific configuration of the X-ray detector and the detector module according to the first embodiment. For example, as shown in FIG. 6, the X-ray detector 200 according to the first embodiment includes a plurality of detect modules 220 that are arranged along the channel direction. In FIG. 6, the X-ray emission direction is represented by the dotted arrows.

As shown in FIG. 6, for example, the supporter 224 supports the X-ray shield 223 such that both ends of the X-ray shield 223 in the channel direction extends to outer sides with respect to the ends of the detector pack 221. Accordingly, the X-ray shield 223 is arranged to intersect with the path of the X-ray passing through between the detector pack 221 and the detector pack of the adjacently-arranged detector module.

Furthermore, the supporter 224 supports the X-ray shield 223 such that one end of the X-ray shield 223 in the channel direction and the other end are arranged in different positions along the X-ray emission direction. For example, as shown in FIG. 6, the X-ray shield 23 is formed of a single flat-plate member. Furthermore, the supporter 224 supports the X-ray shield 223 such that the X-ray shield 223 is oblique to the X-ray emission direction. In this case, the member supporting the X-ray shield 223 among the members constituting the supporter 224 is provided obliquely to the X-ray emission direction.

The supporter 224 supports the X-ray shield 223 such that at least a part of the X-ray shield 223 overlaps the X-ray shield 223 of the adjacently-arranged detector module 220. For example, as shown in FIG. 6, the supporter 224 supports the X-ray shield 223 such that the X-ray shield 223 overlaps the X-ray shield 223 of the adjacently-arranged detector module 220 between the detector pack 211 and the detector pack 221 of the adjacently-arranged detector module 220.

In this configuration, the supporter 224 supports the X-ray shield 223 such that the X-ray shield 223 is asymmetrical along the channel direction. Accordingly, the entire detector module 220 has an asymmetrical shape along the channel direction. Note that asymmetry along the channel direction means asymmetry to the face orthogonal to the channel direction.

FIG. 6 exemplifies the case where the X-ray shield 223 is arranged such that the both ends of the X-ray shield 223 extend to outer sides with respect to the ends of the detector pack 221 and the X-ray shields 223 overlap between the adjacent detector modules 220; however, the first embodiment is not limited to this.

Figure 7:
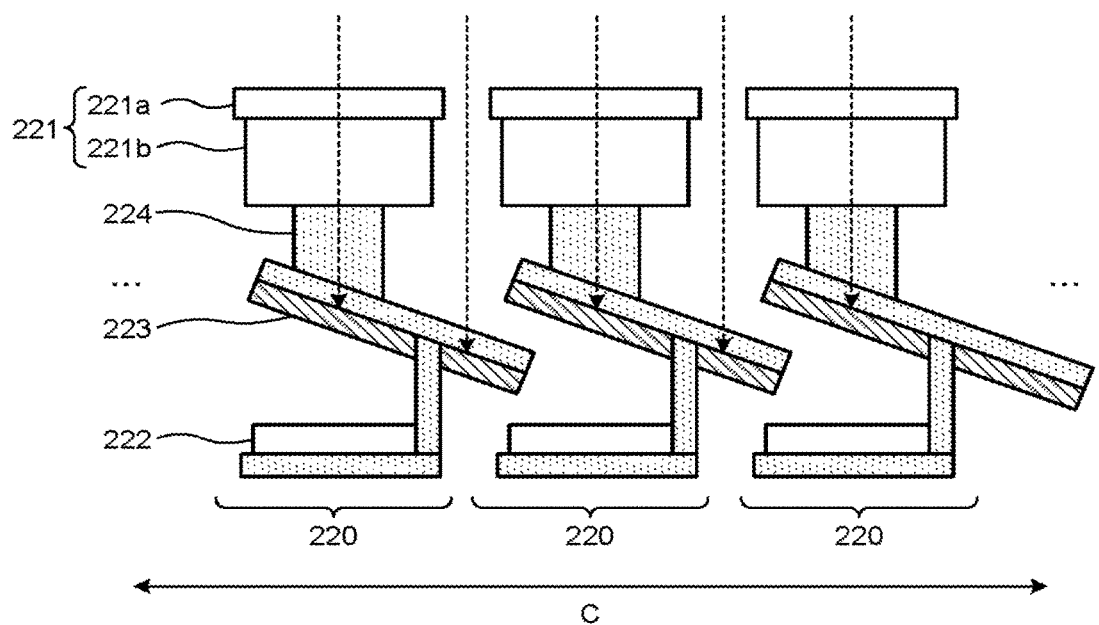
FIG. 7 is a diagram of another exemplary specific configuration of the X-ray detector and the detector module according to the first embodiment.

FIG. 7 is a diagram of another exemplary specific configuration of the X-ray detector and the detector module according to the first embodiment. For example, as shown in FIG. 7, the supporter 224 may support the X-ray shield 223 such that one end of the X-ray shield 223 in the channel direction extends to an cuter side with respect to an end of the detector pack 221. Furthermore, for example, as shown in FIG. 7, the supporter 224 may support the X-ray shield 223 such that the X-ray shield overlaps the X-ray shield 223 of the adjacently-arranged X-ray shield 223 under the detector pack 221.

FIGS. 6 and 7 exemplify the case where the DAS board 222 is arranged orthogonally to the X-ray emission direction; however, the first embodiment is not limited to this. For example, the DAS board 222 may be arranged to be parallel to the X-ray emission direction.

FIGS. 6 and 7 exemplify the case where the supporter 224 supports the X-ray shield 223 form the side of the detector pack 221; however, the first embodiment is not limited to this. For example, the supporter 224 may support the X-ray shield 223 from the side opposite to the detector pack 221. Furthermore, the supporter 224 may include a member having the shape of a flat plate that is arranged obliquely to the X-ray emission direction between the detector pack 221 and the DAS board 222 and the X-ray shield 223 may be formed by performing plating on the front or back surface of the member.

As described above, according to the first embodiment, modularizing the detector pack 221 and the X-ray shield 223 allows easy replacement of a detector pack 221.

Furthermore, according to the first embodiment, arranging the X-ray shield 223 on the side opposite to the surface of the detector pack 221 on which an X-ray is incident makes it possible to prevent an X-ray having passed through the detector pack 221 from being directly incident on a structure, such as an electric board, that is arranged on an outer side with respect to the detector packs 221 in the X-ray emission direction. Arranging the DAS board 222 in parallel with the X-ray emission direction makes it possible to assuredly prevent an X-ray from being directly incident on the DAS board 222.

Furthermore, according to the first embodiment, arranging the X-ray shield 223 such that the X-ray shield intersects with the path of an X-ray passing through between the detector packs 221 of adjacent detector modules 220 makes it possible to more assuredly prevent an X-ray having passed through between the detector packs 221 from being directly incident on a structure, such as an electric board, that is arranged on an outer side with respect to the detector modules 220 in the X-ray emission direction.

Furthermore, according to the first embodiment, arranging the X-ray shield 223 of one of the adjacent detector modules 220 and the X-ray shield 223 of the other detector modules 220 such that the X-ray shields 223 overlap on the path of an X-ray makes it possible to more assuredly prevent an X-ray having passed through between the detector packs 221 from being directly incident on a structure, such as an electric board, that is arranged on an outer side with respect to the detector modules 220 in the X-ray emission direction.

Accordingly, according to the first embodiment, it is possible to replace a detector pack easily and prevent an X-ray from being directly incident on a structure arranged on an outer side with respect to the detector packs in the X-ray emission direction. As a result, it is possible to increase reliability of the X-ray detector.

Furthermore, according to the first embodiment, arranging the X-ray shield 223 asymmetrically along the channel direction enables easy determination of the direction of the detector module 220. As a result, it is possible to improve assemblability of the X-ray detector 200.

Furthermore, according to the first embodiment, forming the X-ray shield 223 of a single flat-plate member and arranging the X-ray shield 223 obliquely to the X-ray emission direction make it possible to implement an X-ray shield structure in a simple configuration using a single flat-plate member for each detector module 220. As a result, it is possible to increase manufacturability of the X-ray detector 200.

When the X-ray shield is arranged obliquely to the X-ray emission direction, the thickness of the X-ray shield 223 and the angle of obliqueness of the X-ray shield 223 with respect to the X-ray emission direction are determined according to the spatial limitation in the X-ray detector 200 and the structural limitation and, furthermore, the material of the X-ray shield 223 and the maximum intensity of X-rays used in the X-ray CT apparatus 100.

Figure 8:
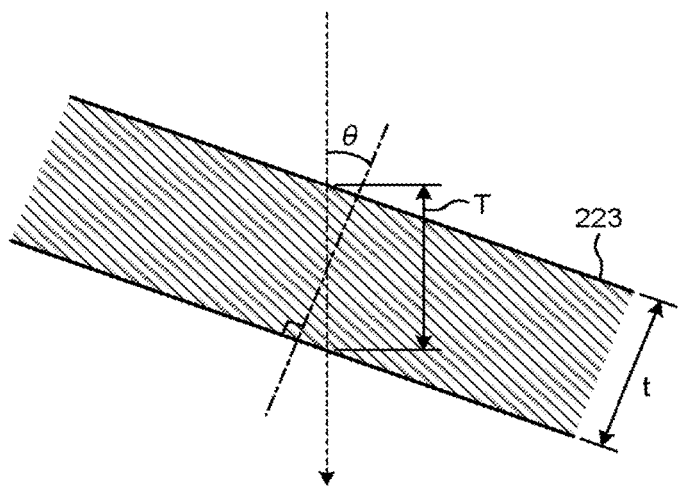
FIG. 8 is a diagram of an exemplary angle of gradient of the X-ray shield according to the first embodiment.

FIG. 8 is a diagram of an exemplary angle of obliqueness of the X-ray shield 223 according to the first embodiment. For example, as shown in FIG. 8, when t is the thickness of the X-ray shield 223 and θ is the angle of obliqueness of the X-ray shield 223 with respect to the X-ray emission direction, the thickness T of the X-ray shield 223 along the X-ray emission direction is represented by T=t/cos θ.

In this case, for example, when T' is the minimum thickness of the x-ray shield 223 necessary to attenuate the intensity of an X-ray to a tolerance or lower, t and θ are determined to satisfy t/cos θ≥T', where T' is determined according to, for example, the material of the X-ray shield 223 and the maximum intensity of X-rays used in the X-ray CT apparatus 100.

When T=T', the thickness t of the X-ray shield 223 is represented by t=T'×cos θ. In other words, setting θ>0 with respect to the obliqueness angle θ makes it possible to reduce the thickness of the X-ray shield 223 to a thickness smaller than T'. Furthermore, for example, when td is the thickness of a part of each X-ray shield 223 overlapping another X-ray shield 223, it is possible reduce td to thickness smaller than T'/2.

As described above, arranging the X-ray shield 223 obliquely to the X-ray emission direction makes it possible to reduce the thickness of the X-ray shield 223 compared to the case where the X-ray shield 223 is arranged orthogonally to the X-ray emission direction. As a result, it is possible to reduce the weight of the X-ray detector 200 and the weight of the detector module 220, which makes it possible to reduce the load of a worker to carry the X-ray detector 200 or replace the detector module 220.

The first embodiment has been described above. Part of the configuration of the X-ray detector of the above-described first embodiment may be modified as appropriate to carry out the first embodiment. A modification of the X-ray CT apparatus according to the first embodiment will be described below. Basically, the X-ray CT apparatus and the X-ray detector of each modification to be described below have the same configuration as that shown in FIGS. 1 and 2. For this reason, aspects different from those of the first embodiment will be described mainly and components having the same functions as those of the components already described above will be denoted with the same reference numbers and detailed descriptions thereof will be omitted.

First Modification of First Embodiment

For example, the above-described first embodiment exemplifies the case where the X-ray shield 223 formed of the uniform flat-plate member and is arranged obliquely to the X-ray emission direction; however, the first embodiment is not limited to this. For example, multiple flat-plate members may be used as an X-ray shield member and the flat-plate members may be arranged in different positions in the X-ray emission direction so that the flat-plate members are arranged in an overlapping manner.

In this case, for example, the X-ray shield includes at least two flat-plate members. The supporters support the respective flat-plate members such that the flat-plate members are parallel to the surface of the detector pack 221 on which an X-ray is incident and are arranged in different positions along the X-ray emission direction.

Figure 9:
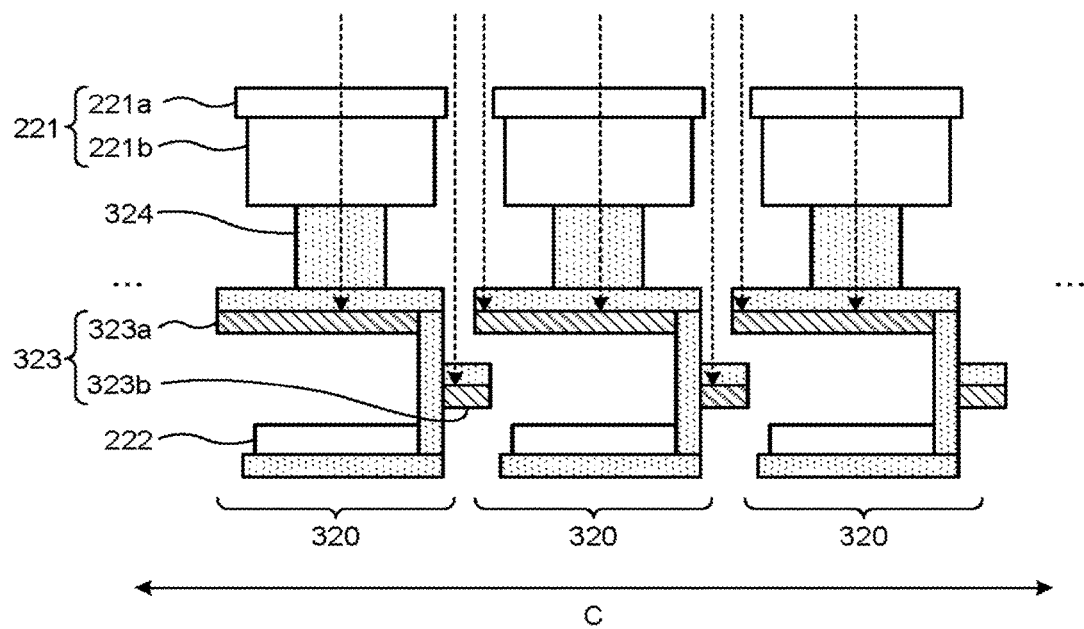
FIG. 9 is a diagram of an exemplary specific configuration of an X-ray detector and a detector module according to a first modification of the first embodiment.

FIG. 9 is a diagram of an exemplary specific configuration of an X-ray detector and a detector module in a first modification of the first embodiment. For example, as shown in FIG. 9, the X-ray detector according to the first modification includes a plurality of detector modules 320 that are arranged to be lined along the channel direction.

The detector modules 320 have the same configuration. Specifically, each of the detector modules 320 includes the detector pack 221, the DAS board 222, an X-ray shield 323, and a supporter 324. In other words, in the first modification, the detector pack 221, the DAS hoard 222, the X-ray shield 323, and the supporter 324 are modularized.

For example, as shown in FIG. 9, the X-ray shield 323 according to the first modification includes a flat-plate member 323a and a flat-plate member 323b. Each of the flat-plate member 323a and the flat-plate member 323b attenuates X-rays passing through the flat-plate members 323a and 323b. For example, each of the flat-plate member 323a and the flat-plate member 323b is formed of a material, such as lead, tungsten, or molybdenum.

The supporter 324 supports the detector pack 221, the DAS board 222, the flat-plate member 323a, and the flat-plate member 323b. For example, the supporter 324 consists of a member that supports the detector pack 221, a member that supports the DAS board 222, a member that supports the flat-plate member 323a, and a member that supports the flat-plate member 323b, and the supporter 324 is formed by mechanically connecting the members. For example, the supporter 324 is formed of a material, for example, metal, such as aluminum or stainless steel, or resin.

Specifically, the supporter 324 supports each of the flat-plate members such that the flat-plate member 323a is arranged on one side in the channel direction and the flat-plate member 323b is arranged on the other side. The supporter 324 supports each of the flat-plate member 323a and the flat-plate member 323b such that the flat-plate member 323a and the flat-plate member 323b are parallel to the surface of the detector pack 221 on which an X-ray is incident.

The supporter 324 supports the flat-plate member 323a such that flat-plate member 323a is arranged on the side opposite to the surface of the detector pack 221 on which an X-ray is incident. Accordingly, the flat-plate member 323a is arranged to intersect with the path of the X-ray passing through the detector pack 221. The flat-plate member 323a is arranged between the detector pack 221 and the DAS board 222.

The supporter 324 supports the flat-plate member 323a such that an end of the flat-plate member 323a extends to an outer side with respect to an end of the detector pack 221. Furthermore, the supporter 324 supports the flat-plate member 323b such that an end of the flat-plate member 323b protrudes to an outer side with respect to the end of the detector pack on the opposite side to which the flat-plate member 323a extends.

Accordingly, the flat-plate members 323a and 323b are arranged such that, on the sides opposite to each other, the flat-plate members 323a and 323b respectively intersect also with the paths of X-rays that pass through between the detector pack 221 and the detector pack 221 of the adjacently-arranged detector module 320. As in the example described with reference to FIG. 7, the supporter 324 may support each of the flat-plate members 323a and 323b such that any one of ends of the flat-plate members 3a and 323b extends to an outer side with respect to an end of the detector pack 221.

Furthermore, the supporter 324 supports the flat-plate members 323a and 323b such that the flat-plate members 323a and 323b are arranged at different levels along the X-ray emission direction. In other words, the supporter 324 supports each of the flat-plate members such that the positions of the flat-plate members are diffident from each other along the X-ray emission direction. Accordingly, the flat-plate members are arranged in a stepwise manner along the X-ray emission direction.

The supporter 324 supports the flat-plate member 323b such that at least a part of the flat-plate member 323b overlaps the flat-plate member 323a of the adjacently-arranged detector module 320 on the path of an X-ray. The position at which the flat-plate members overlap may be, as in the example described with reference to FIGS. 6 and 7, between adjacent detector packs 221 or under the detector packs 221.

FIG. 9 exemplifies the case where the X-ray shield 323 includes the two flat-plate members 323a and 323b; however, the first embodiment is not limited to this. For example, the X-ray shield 323 may include three or more flat-plate members.

Figure 10:
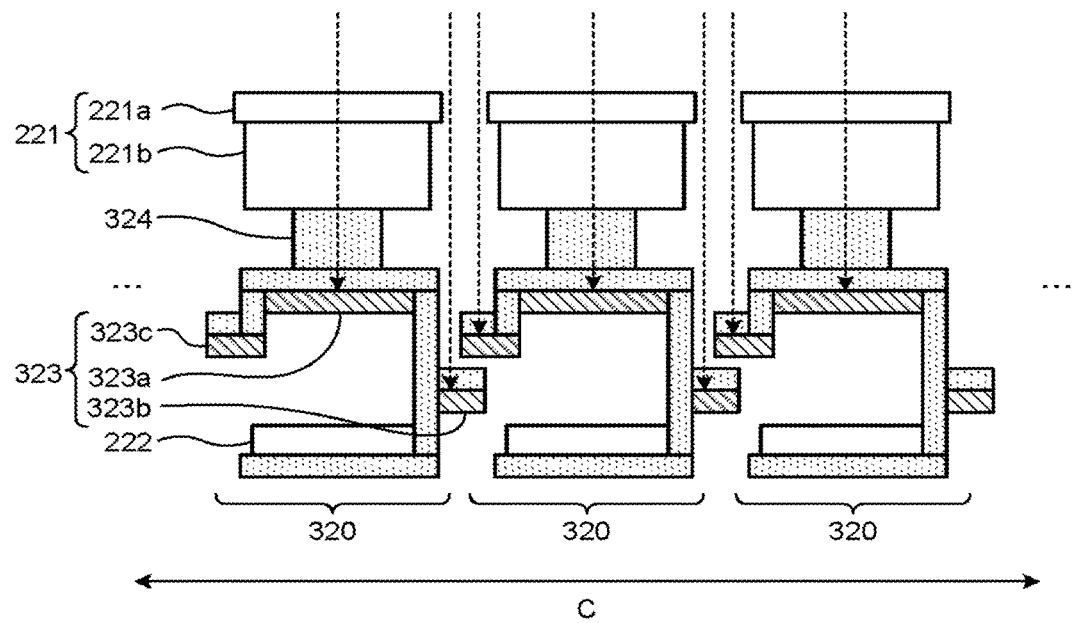
FIG. 10 is a diagram of another exemplary specific configuration of the X-ray detector and the detector module of the first modification of the first embodiment.

FIG. 10 is a diagram of an exemplary specific configuration of an X-ray detector and a detector module according to the first modification of the first embodiment. For example, as shown in FIG. 10, the X-ray shield 323 according to the first modification includes the flat-plate member 323a, the flat-plate member 323b, and a flat-plate member 323c.

In this case, the supporter 324 supports the flat-plate member 323a, the flat-plate member 323b, and the flat-plate member 323c such that they are arranged at different positions along the channel direction. The supporter 324 supports the flat-plate member 323a, the flat-plate member 323b, and the flat-plate member 323c such that the flat-plate members 323b and 323c are arranged on both side of the flat-plate member 323a, respectively, in the channel direction. The supporter 324 supports the flat-plate member 323a, the flat-plate member 323b, and the flat-plate member 323c such that they are parallel to the surface of the detector pack 221 on which an X-ray is incident.

The supporter 324 supports the flat-plate member 323a such that the flat-plate member 323a is arranged on the opposite side to the surface of the detector pack 221 on which an X-ray is incident. Accordingly, the flat-plate member 323a is arranged to intersect with the path of the X-ray passing through the detector pack 221. The flat-plate member 323a is arranged between the detector pack 221 and the DAS board 222.

The supporter 324 supports the flat-plate member such that an end of the flat-plate member 323c extends to an outer side with respect to an end of the detector pack 221. Furthermore, the supporter 324 supports the flat-plate member 323b such that an end of the flat-plate member 323b extends to an outer side with respect to an end of the detector pack 221 on the side opposite to the flat-plate member 323a in the channel direction.

Accordingly, the flat-plate members 323c and 323b are arranged such that, on the opposite sides in the channel direction, the flat-plate members 323a and 323b intersect with the paths of X-rays that pass through between the detector pack 221 and the detector pack 221 of the adjacently-arranged detector module 320. As in the example described with reference to FIG. 7, the supporter 324 may support each of the plate members such that one end of any one of the flat-plate members 323a and 323b extends to an outer side with respect to the end of the detector pack 221.

Furthermore, the supporter 324 supports the flat-plate members 323a, 323b, and 323c such that they are arranged at different positions alone the X-ray emission direction. In other words, the supporter 324 supports each of the flat-plate members such that the positions of the flat-plate members are diffident from each other along the X-ray emission direction. Accordingly, the flat-plate members are arranged at different levels along the X-ray emission direction.

The supporter 324 supports the flat-plate member 323b such that at least a part of the flat-plate member 323b overlaps the flat-plate member 323a of the adjacently-arranged detector module 320 on the path of an X-ray. The position at which the flat-plate members overlap may be, as in the example described with reference to FIGS. 6 and 7, between adjacent detector packs 221 or under the detector pack 221.

FIGS. 9 and 10 exemplify the case where the X-ray shield 323 includes the flat-plate members; however, the first embodiment is not limited to this. For example, the parts of the X-ray shield 323 corresponding to the respective flat-plate members shown in FIGS. 9 and 10 may be formed by performing bending processing on a single plate-shaped member.

Figure 11:
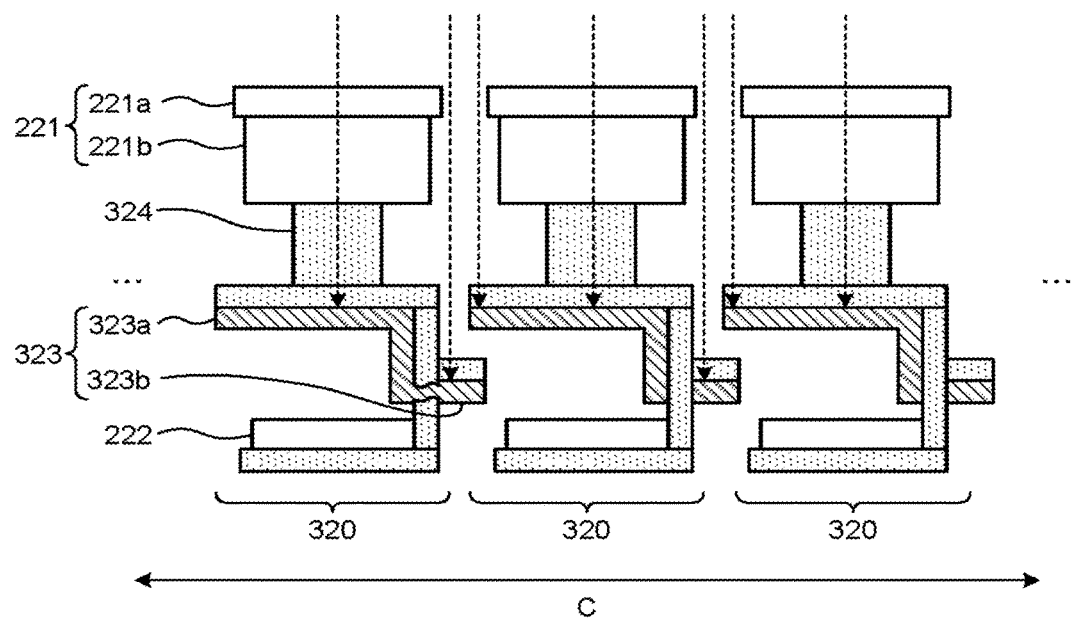
FIG. 11 is a diagram of another exemplary X-ray shield of the first modification of the first embodiment.

FIG. 11 is a diagram of another exemplary X-ray shield 323 of the first modification of the first embodiment. For example, as shown in FIG. 11, the X-ray shield 323 is formed by bending a plate-shaped member to the opposite sides in two areas such that the cross-section of the plate member is approximately Z-shaped. Accordingly, a plate-shaped part of the X-ray shield 323 positioned on an upper side serves as the part corresponding to the flat-plate member 323a shown in FIG. 9 and a plate-shaped part of the X-ray shield 323 positioned at a lower side serves as the part corresponding to the flat-plate member 323b shown in FIG. 9. Accordingly, an X-ray shield having the same function as that of the X-ray shield 323 shown in FIG. 9 is obtained. By bending a plate-shaped member in four areas such that the cross-section of the plate member is approximately a-shaped in the same manner, it is possible to form the parts corresponding to the three flat-plate members 323a to 323c shown in FIG. 10. Accordingly, an X-ray shield having the same function as that of the X-ray shield 323 shown in FIG. 10 is obtained.

According to the first modification described above, as in the first embodiment, it is possible to replace a detector pack easily and prevent an X-ray from directly being incident on a structure that is arranged on an outer side with respect to the detector packs in the X-ray emission direction. As a result, it is possible to increase reliability of the X-ray detector.

Furthermore, according to the first modification, it is unnecessary to use an oblique member for arranging an X-ray shield obliquely as in the examples shown in FIGS. 6 and 7 and according adjustment on the angle of obliqueness is unnecessary, which makes it possible to design and manufacture the detector module easily.

Second Modification of First Embodiment

Furthermore, for example, the first embodiment and the first modification exemplify the case where each detector module has the same configuration; however, the first embodiment is limited to this. For example, multiple types of detector modules in which the positions of the X-ray shields are different from each other in the X-ray direction may be used.

Figure 12:
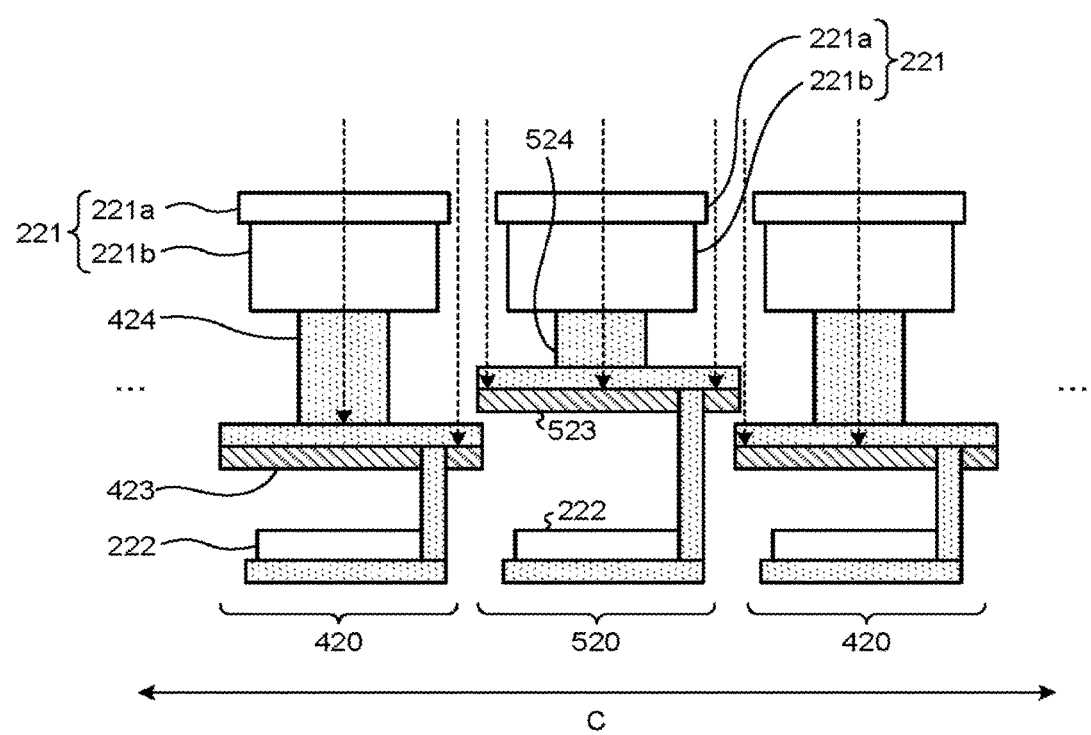
FIG. 12 is a diagram of an exemplary specific configuration of an X-ray detector and a detector module of a second modification of the first embodiment.

FIG. 12 is a diagram of an exemplary specific configuration of an X-ray detector and a detector module according to the second modification of the first embodiment. For example, as shown in FIG. 12, the X-ray detector according to the first modification includes two types of detector modules 420 and 520 that are arranged alternately along the channel direction.

The detector module 420 includes the detector pack 221, the DAS board 222, an X-ray shield 423, and a supporter 424. In other words, in the second modification, the detector pack 221, the DAS board 222, the X-ray shield 423, and the supporter 424 are modularized.

The supporter 424 supports the detector pack 221, the DAS board 222, and the X-ray shield 423. The supporter 424 supports the X-ray shield 423 such that the X-ray shield 423 is arranged on an opposite side to the surface of the detector pack 221 on which an X-ray is incident. Accordingly, the X-ray shield 423 is arranged to intersect with the path of the X-ray passing through the detector pack 221. The X-ray shield 423 is arranged between the detector pack 221 and the DAS board 222.

Furthermore, the supporter 424 supports the X-ray shield 423 such that the X-ray shield 423 is parallel to the surface of the detector pack 221 on which the X-ray is incident. The supporter 424 supports the X-ray shield 223 such that both ends of the X-ray shield 423 in the channel direction extend to outer sides with respect to the ends of the detector pack 221. Accordingly, the X-ray shield 423 is arranged to intersect also with the path of an X-ray passing through between the detector pack 221 and the detector pack 221 of the adjacently-arranged detector module 520. As in the example described with reference to FIG. 7, the supporter 424 may support each flat-plate member such that one of the ends of the X-ray shield 423 in the channel direction extends to an outer side with respect to an end of the detector pack 221.

On the other hand, the detector module 520 includes the detector pack 221, the DAS board 222, an X-ray shield 523, and a supporter 524. In other words, in the second modification, the detector pack 221, the DAS board 222, the X-ray shield 523, and the supporter 524 are modularized.

The supporter 524 supports the detector pack 221, the DAS board 222, and the X-ray shield 523. The supporter 524 supports the X-ray shield 523 such that the X-ray shield 523 is arranged on the side opposite to the surface of the detector pack 221 on which an X-ray is incident. Accordingly, the X-ray shield 523 is arranged to intersect with the path of the X-ray passing through the detector pack 221. The X-ray shield 523 is arranged between the detector pack 221 and the GAS board 222.

Furthermore, the supporter 524 supports the X-ray shield 523 such that the X-ray shield 523 is parallel to the surface of the detector pack 221 on which an X-ray is incident. The supporter 24 supports the X-ray shield 523 such that both ends of the X-ray shield 523 in the channel direction extend to outer sides with respect to the ends of the detector pack 221. Accordingly, the X-ray shield 523 is arranged to intersect also with the path of an X-ray passing through between the detector pack 221 and the detector pack 221 of the adjacently-arranged detector module 420. As in through example described with reference to FIG. 7, the supporter 524 may support each flat-plate member such that one of the ends of the X-ray shield 523 in the channel direction extends to an outer side with respect to an end of the detector pack 221.

Furthermore, the supporter 524 supports the X-ray shield 523 such that the X-ray shield 523 is arranged at a position different from that of the X-ray shield 423 of the detector module 420 along the X-ray emission direction. Furthermore, the supporter 524 supports the X-ray shield 523 such that at least a part of the X-ray shield 523 overlaps the X-ray shield 423 of the adjacently-arranged detector module 420 on the X-ray path. The position at which the flat-plate members overlap may be, as in the examples described with reference to FIGS. 6 and 7, between adjacent detector packs 221 or under the detector pack 221.

FIG. 1 exemplifies the case where two types of detector modules 420 and 520 are used; however, the first embodiment is not limited to this. For example, three or more types of detector modules in which the positions of X-ray shields are different from one another along the X-ray emission direction may be used.

According to the second modification described above, as in the above-described first embodiment, it is possible to replace a detector pack easily and prevent an X-ray from directly being incident on a structure that is arranged on an outer side with respect to the detector packs in the X-ray emission direction. As a result, it is possible to increase reliability of the X-ray detector.

Furthermore, according to the second modification, while multiple types of detector modules are used, it is unnecessary for the supporter to have a configuration for arranging an X-ray shield obliquely or arranging X-ray shields at different levels, which makes it possible to design and manufacture the detector module easily.

Third Modification of First Embodiment

For example, the first embodiment exemplifies the case where X-ray shields that are provided respectively in detector modules adjacent to each other overlap; however, the first embodiment is not limited to this. For example, an X-ray shield that is provided in a detector module may overlap an X-ray shield that is provided independently of the detector module.

Figure 13:
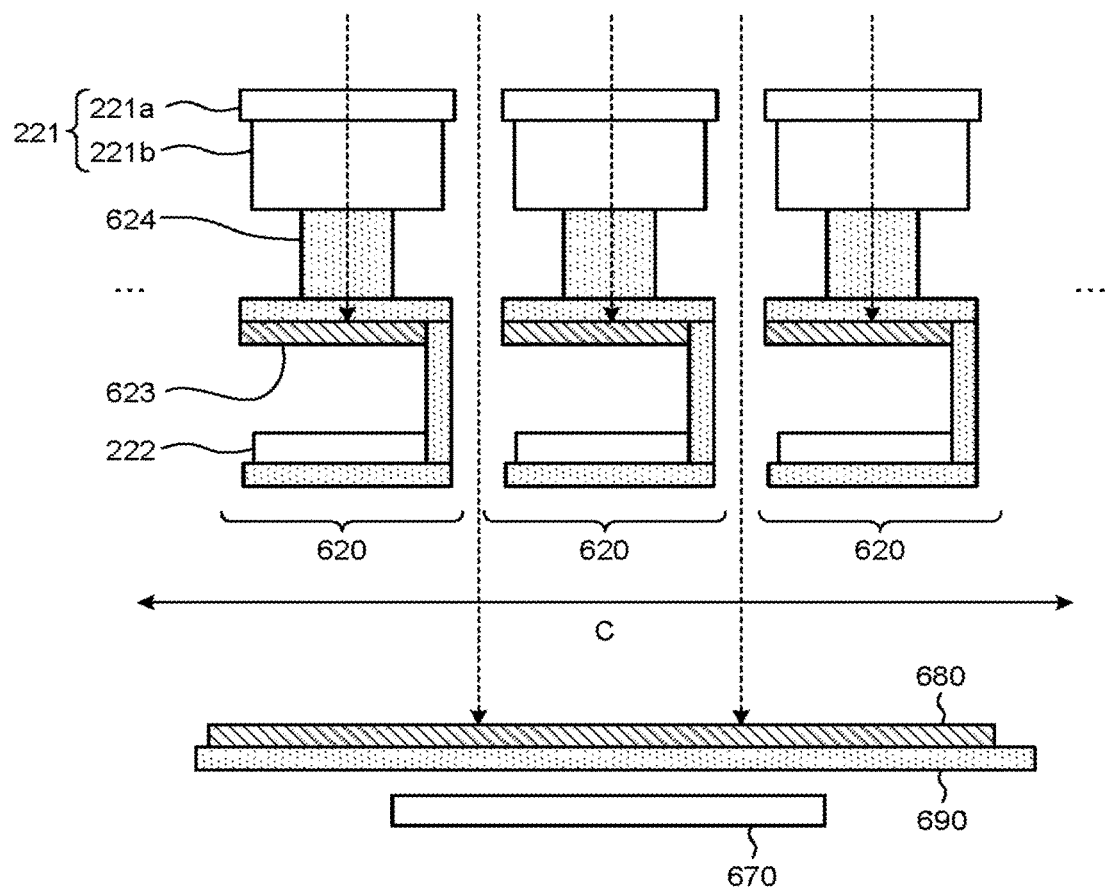
FIG. 13 is a diagram of an exemplary specific configuration of an X-ray detector and a detector module of a third modification of the first embodiment.

FIG. 13 is diagram of an exemplary specific configuration of an X-ray detector and a detector module of a third modification of the first embodiment. For example, as shown in FIG. 13, the X-ray detector according to the third modification includes a plurality of detector modules 620 that are arranged to be lined in the channel direction.

The detector modules 620 have the same configuration. Specifically, each of the detector modules 620 includes the detector pack 221, the DAS board 222, an X-ray shield 623, and a supporter 624. In other words, in the third modification, the detector pack 221, the DAS board 222, the X-ray shield 623, and the supporter 624 are modularized.

The supporter 624 supports the detector pack 221, the DAS board 222, and the X-ray shield 623. The supporter 624 supports the X-ray shield 623 such that the X-ray shield 623 is arranged on a side opposite to the surface of the detector pack 221 on which an X-ray is incident. Accordingly, the X-ray shield 623 is arranged to intersect with the path of the X-ray passing through the detector pack 221. The X-ray shield 623 is arranged between the detector pack 221 and the DAS board 222.

The X-ray detector according to the third modification includes an electric board 670 that is provided before the detector modules 620 in the X-ray emission direction. For example, the electric board 670 is an electric board that the non-contact data transmitter 115 includes or an electric board for controlling the DAS board 222 of each of the detector modules 620.

The X-ray detector according to the third modification further includes an X-ray shield 680 and a supporter 690.

The supporter 690 supports the X-ray shield 680. For example, the supporter 690 is formed of a material, for example, metal, such as aluminum or stainless steel, or resin. The supporter 690 supports the X-ray shield 680 such that the X-ray shield 680 is arranged to run along the detector modules 620 on an outer side with respect to each detector module 620 in the X-ray emission direction. Accordingly, the X-ray shield 680 is arranged to intersect with the paths of X-rays that pass through between the detector packs 221. Furthermore, the X-ray shield 680 is arranged between each detector module 620 and the electric board 670.

In the third modification, the supporter 624 that is provided in each of the detector modules 620 supports the X-ray shield 623 such that at least a part of the X-ray shield 623 overlaps, on the X-ray path, the X-ray shield 680 that is arranged before each detector module 620 along the X-ray emission direction.

FIG. 13 exemplifies the case where the X-ray shields 623 that are provided in the adjacent detector modules 620 do not overlap; however, the first embodiment is not limited to this. For example, instead of the detector modules 620, detector modules in which X-ray shields overlap as described with respect to the above-described embodiment and modifications may be used.

FIG. 13 exemplifies the case where the X-ray shield 680 is arranged such that the X-ray shield 680 runs along the three detector modules 620; however, the first embodiment is not limited to this. For example, the X-ray shield 680 may be arranged to run along three or more detector modules 620 or may be divided into a plurality of X-ray shields and each of the X-ray shields may be arranged to run along adjacent detector modules 620.

As described above, according to the third modification, arranging the X-ray shield 623 on the opposite side to the surface of the detector pack 221 on which an X-ray is incident makes it possible to prevent an X-ray having passed through the detector pack 221 from directly being incident on a structure, such as an electric board, that is arranged on an outer side with respect to the detector packs 221 in the X-ray emission direction.

Furthermore, according to the third modification, arranging the X-ray shield 680 such that the X-ray shield 680 intersect with X-rays that pass through between the detector packs 221 of the adjacent detector modules 620 makes it possible to prevent an X-ray having passed through between the detector packs 221 from being directly incident on a structure, such as an electric board, that is provided on an outer side with respect to the detector modules 620 in the X-ray emission direction.

Furthermore, according to the third modification, arranging the X-ray shield 623 that is provided in each of the detector modules 620 and the X-ray shield 680 that is arranged before each of the detector modules 620 along the X-ray emission direction such that the X-ray shield 623 and the X-ray shield 680 overlap on the paths of X-rays makes it possible to assuredly prevent X-rays having passed through between the detector packs 221 from being directly incident on a structure, such as an electric board, arranged on an outer side with respect to the detector modules 620 in the X-ray emission direction.

Accordingly, according to the third modification, as in the above-described first embodiment, it is possible to replace a detector pack easily and prevent X-rays from being directly incident on a structure that is arranged on an outer side with respect to the detector packs in the X-ray emission direction. As a result, it is possible to increase reliability of the X-ray detector.

Furthermore, according to the third modification, only arranging the X-ray shield 680 on the outer side with respect to each of the detector modules 620 in the X-ray emission direction makes it possible to prevent X-rays from being directly incident on the structure, such as an electric board, that is arranged before the detector modules 620. As a result, it is possible to implement an X-ray shield easily.

Fourth Modification of First Embodiment

The first embodiment and the modifications thereof described above exemplify the case where the supporter that the detector module includes is formed by mechanically connecting the multiple members; however, the first embodiment is not limited to this. For example, the supporter may be manufactured from at least one metal plate by performing plate working.

FIG. 14 is a diagram of an exemplary supporter of a fourth modification of the first embodiment. FIG. 14 exemplifies a case where a supporter having the same shape as that of the supporter 224 shown in FIG. 6 is manufactured and, in the same manner, it is also possible to manufacture the same supporters as those represented in the above-described modifications.

First of all, as shown in the upper diagram in FIG. 14, a part 724x that supports the detector pack 221, a part 724y that supports the X-ray shield 223, and a part 724z that supports the DAS board 222 are formed in a metal plate serving as a material by, for example, shearing.

Then, as shown in the diagram in the middle in FIG. 14, the dotted areas in the upper diagram in FIG. 14 are bent backward and the dashed and dotted area is bent forward by performing, for example, bending processing so that a supporter 724 having the same shape as that of the supporter 224 is formed. The diagram in the middle in FIG. 14 is a diagram of the metal plate, which is shown in the upper diagram, viewed from its one side.

Then, as shown in the lower diagram in FIG. 14, the detector pack 221 is attached to the part 724x that the supporter 724 includes, the X-ray shield 223 is attached to the part 724y, and the DAS board 222 is attached to the part 724z so that a detector module 720 is configured.

The case where the entire supporter 724 is manufactured from the single metal plate is exemplified here; however, the first embodiment is not limited to this. The supporter may be manufactured from multiple metal plates. For example, multiple parts configuring a supporter may be manufactured from a single metal plate by plate working and the parts may be connected to form the supporter.

According to the fourth modification of the first embodiment, as in the above-described first embodiment, it is possible to replace a detector pack easily and prevent an X-ray from being directly incident, on a structure that is arranged on an outer side with respect to the detector packs. As a result, it is possible to increase reliability of the X-ray detector.

Furthermore, according to the fourth modification, because the supporter that the detector module includes is manufactured by performing plate working, it is possible to manufacture the detector module easily compared to the case where multiple members are connected to manufacture a supporter.

Second Embodiment

In general, it is known that electromagnetic noise occurs in an X-ray detector used in an X-ray CT apparatus, depending on electronic parts. As described above, when an X-ray shield is divided, electromagnetic noise may pass through between X-ray shields and affects an electric board, etc.

As a measure on the noise, for example, providing an electromagnetic shield additionally or filling the space between X-ray shields with a conductive member may be assumed; however, providing an additional electromagnetic shield increases the number of parts, which may increase the cost of manufacturing an X-ray detector and may increase the weight of the X-ray detector. Filling the space between the X-ray shields with a conductive member may make it difficult to perform an operation of replacing a detector pack or assembling the X-ray detector.

For this reason, each detector module that the X-ray detector includes may further has a configuration for enabling easy replacement of a detector pack and curbing the effects of noise on, for example, the electric board. Such an exemplary case will be described as the second embodiment.

The configuration of an X-ray CT apparatus and an X-ray detector according to the second embodiment is basically same as that shown FIGS. 1 and 2 and are only different from that shown in FIGS. 1 and 2 in part of the configuration of the X-ray detector and the detector module. For this reason, only different aspects of the X-ray detector and the detector module according to the second embodiment from those of the first embodiment will be described mainly below.

Specifically, in the second embodiment, each detector module further includes a conductive member that is provided to protrude from a supporter and the end of the protrusion makes contact with a supporter of an adjacently-arranged detector module and accordingly the conductive member is arranged in a gap between the supporters.

Figure 15:
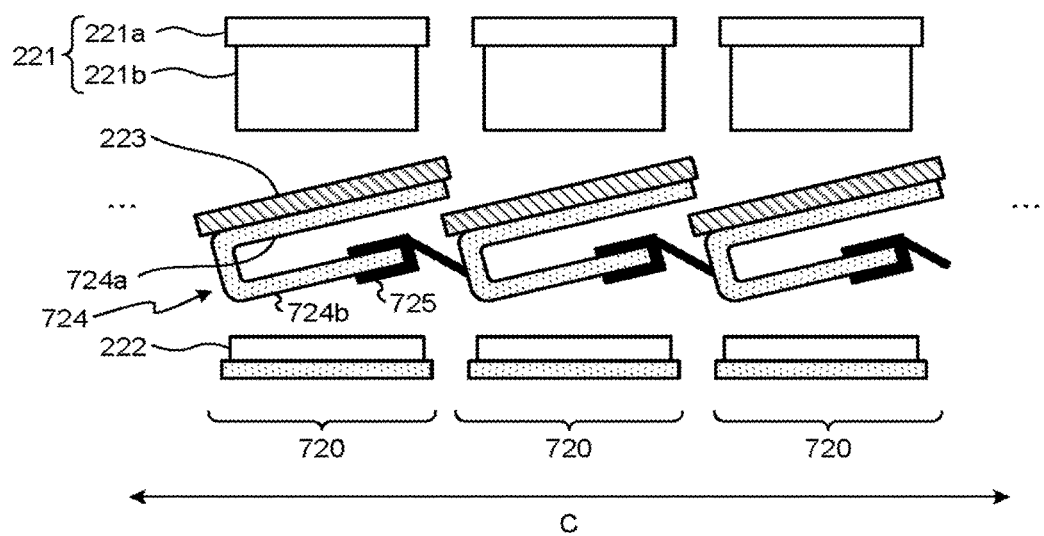
FIG. 15 is a diagram of an exemplary specific configuration of an X-ray detector and a detector module according to a second embodiment.

FIG. 15 is a diagram of an exemplary specific configuration of the X-ray detector and the detector module according to the second embodiment. For example, as shown in FIG. 15, the X-ray detector according to the second embodiment includes, as in the first embodiment, a plurality of detector modules 720 in which a plurality of detector packs 221 are arranged along the channel direction. The detector modules 720 have the same configuration.

The detector module 720 includes the detector pack 221, the GAS board 222, the X-ray shield 223, the supporter 724, and a conductive member 725. Note that, in the example shown in FIG. 15, with respect to the supporter 724, only a member that supports the X-ray shield 223 and a member that supports the GAS board 222 are illustrated and a member that supports the detector pack 221 and a part that connects the members are not illustrated.

The supporter 724 supports the detector pack 1, the GAS board 222, and the X-ray shield 223. For example, as shown in FIG. 15, the supporter 724 supports the X-ray shield 223 obliquely as in the example shown in FIG. 6. The supporter 724 is formed of a material having rigidity with which the supporter 724 is able to support the detector pack 221, the GAS board 222, and the X-ray shield 223 while maintaining the relationship among their respective positions. Furthermore, in the second embodiment, the supporter 724 is formed of a conductive material enabling shield from electromagnetic waves. For example, the supporter 724 is formed of a material, for example, metal, such as aluminum or stainless steel, or conductive resin.

For example, as shown in FIG. 15, the supporter 724 is formed by performing processing of bending a plate-shaped member in two areas in the same direction such that the cross-section of the supporter 724 is approximately U-shaped. Accordingly, as shown in FIG. 15, the supporter 724 is formed to have a double layer structure including flat parts 724a and 724b. In the supporter 4, the X-ray shield 223 is arranged on the surface of the flat part 724a that is arranged on a side opposed to the detector pack 221. Furthermore, in the supporter 724, the conductive member 725 is provided on a side opposite to the bent part in the flat part 724b flat is arranged on a side opposed to the GAS board 222.

Figure 16:
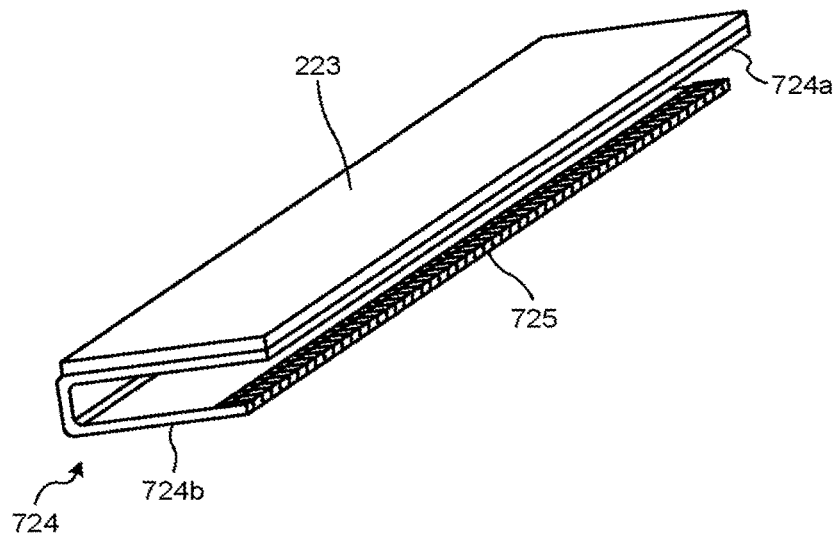
FIG. 16 is a diagram of an exemplary configuration of a supporter according to the second embodiment.

FIG. 16 is a diagram of an exemplary configuration of the supporter 724 according to the second embodiment. For example, as shown in FIG. 16, the conductive member 725 is provided on the side of the flat part 724b of the supporter 724, which is the side opposite to the bent part in the flat part 724b, to implement a continuous filling from one end of the side to the other end; however, the second embodiment is not limited to this. For example, conductive member 725 may be provided in a part of the side in the flat part 724b or may be provided irregularly in multiple parts.

For example, as shown in FIG. 15, the conductive member 725 is provided protrude from the supporter 724 and is formed such that the end of the protrusion makes contact with the supporter 724 of an adjacently-arranged detector module 720. For example, the conductive member 725 is provided to protrude toward the outside of the supporter 724 from a side of the flat part 724c arranged on a side opposed to the DAS board 222, which is the side opposite to the bent part of the flat part 721b.

For example, the conductive member 725 is configured a stretchable and flexibility member. The conductive member 725 is provided such that, when the detector modules 720 are arranged to be lined to assemble the X-ray detector, the end of the protrusion is pressed against the supporter 724 of the adjacently-provided detector module 720. For example, a flat spring or a conductive rubber is used as the conductive member 725.

As described above, in the second embodiment, the conductive member 725 is arranged such that the protrusion end of the conductive member 725 makes contact with the supporter 724 of the adjacently-arranged detector module 720 to fill the gap between the supporters 724 of the detector modules 720. As a result, the conductive members 725 make the gaps between the supporters 71 conductive and the supporters 724 function as a continuous single electromagnetic shield. Accordingly, it is possible to reduce the electromagnetic noise passing through between the X-ray shied 223. Furthermore, because the conductive member 725 is configured such that its protrusion end makes contact with the supporter 724 of the adjacently-arranged detector module 720 when the detector modules 720 are arranged to be lined, it is possible to maintain independency of each detector module 720.

Accordingly, according to the second embodiment, it is possible to replace a detector pack easily and curb effects of noise on the electric board.

In the second embodiment, the X-ray shield 223 is arranged as in the first embodiment and accordingly, as in the first embodiment, it is possible to replace a detector pack easily and prevent radiation from being directly incident on a structure that arranged on an outer side with respect to the detector packs the direction in which radiation is emitted.

Furthermore, in the second embodiment, because the supporters 724 function as the continuous single electromagnetic shield, it is possible to reduce the number of parts compared to a case where an electromagnetic shield is additionally provided. Accordingly, it is possible to curb the cost of manufacturing the X-ray detector and curb the cost effects of noise on the electric board while curbing an increase in weight of the X-ray detector.

Furthermore, in the second embodiment, the supporter 724 is formed by performing bending processing on the plate-shaped member such that the cross-section of the supporter 724 is approximately U-shaped. Accordingly, it is possible to improve rigidity of the supporter compared to a case where a supporter having the shape of a flat plate is used. For example, because the X-ray shield supported by the supporter is plate-shaped and thus has low rigidity, the X-ray shield may deform and fails due to the centrifugal force occurring when the X-ray detector rotates. On the other hand, according to the second embodiment, it is possible to improve the rigidity of the supporter and accordingly it is possible to assuredly prevent a failure due to deformation of the X-ray shield.

Furthermore, in the second embodiment, for example, the conductive member 725 is configured of a stretchable and flexibility member and accordingly the supporters 724 are connected while the assembling tolerance between the supporters 724 is absorbed. This makes it possible to improve assemblability of the X-ray detector.

As described above, when the conductive member 725 is provided on the supporter 724, a taper may be formed in a part of the supporter 724 that makes contact with the conductive member 725 of the detector module 720 that is adjacently arranged to assemble the X-ray detector.

Figure 17:
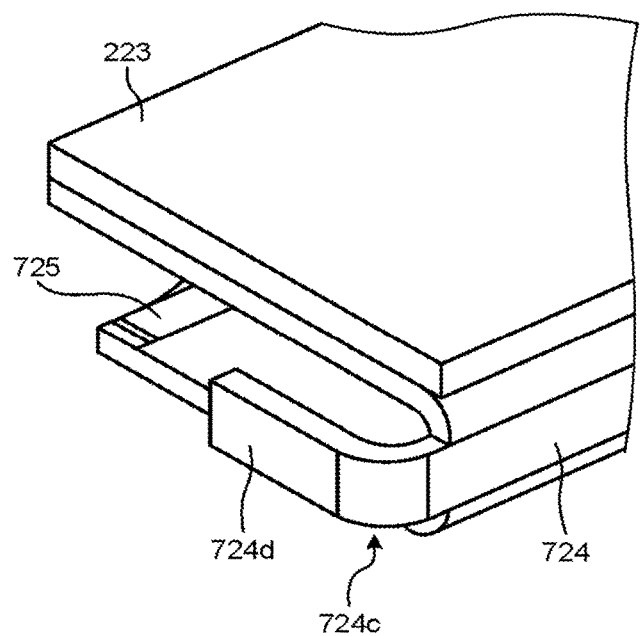
FIG. 17 is a diagram of an exemplary taper that is formed in the supporter according to the second embodiment.

FIG. 17 is a diagram of an exemplary taper that is formed on the supporter 724 according to the second embodiment. For example, as shown in FIG. 17, a taper 724c is formed at one end of a side of the supporter 724 in the longitudinal direction, which is the side opposite to the e on which the conductive member 725 is provided.

For example, the taper 724c is formed by bending a protrusion 724d that is formed at one end of the bent part of the supporter 724 toward the inside of the supporter 724. Accordingly, for example, it is possible to form a taper without performing cutting or removal processing at the end of the supporter 724, which curbs the cost of manufacturing the supporter 724.

Figure 18:
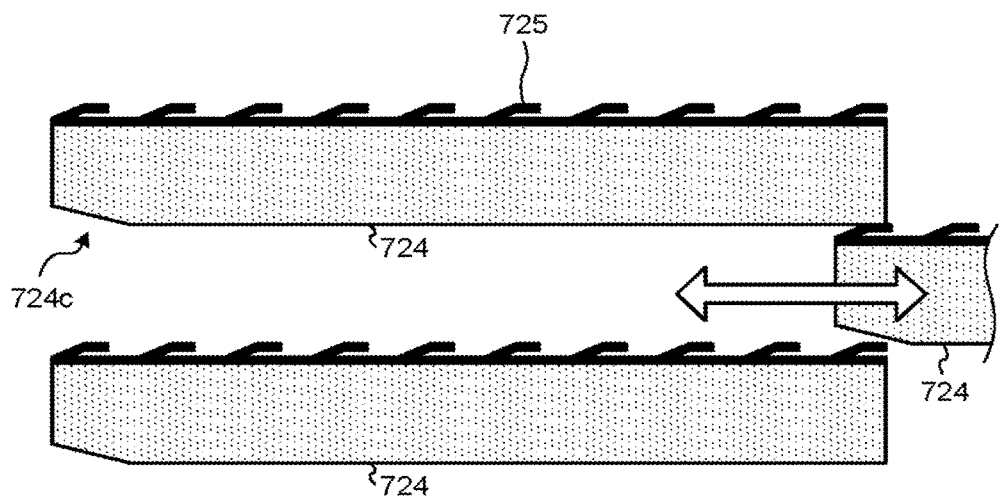
FIG. 18 is a diagram of operations of assembling the X-ray detector according to the second embodiment.

FIG. 18 is a diagram of an operation of assembling the X-ray detector according to the second embodiment. As described above, forming the taper 724c at one end of a side of the supporter 724 in the longitudinal direction, which the side opposite to the side on which the conductive member 725 is provided, makes it possible to increase slidability with respect to the conductive members 725 of the adjacent detector modules 720. Accordingly, for example, as shown in FIG. 18, when the detector modules 720 are arranged to be lined to assemble an X-ray detector, it is possible to smoothly set the detector module 720 while pressing the taper 724c of the supporter 724 against the conductive member 725 of the adjacent detector module 720. Accordingly, it is possible to perform an operation of replacing a detector pack and an operation of assembling an X-ray detector more easily.

The configuration of the X-ray detector and the detector module according to the second embodiment is not necessarily limited to that shown in FIG. 15. It is possible to carry out the second embodiment in various different modes. Modifications of the X-ray detector and the detector module according to the second embodiment will be described below.

First Modification of Second Embodiment

Figure 19:
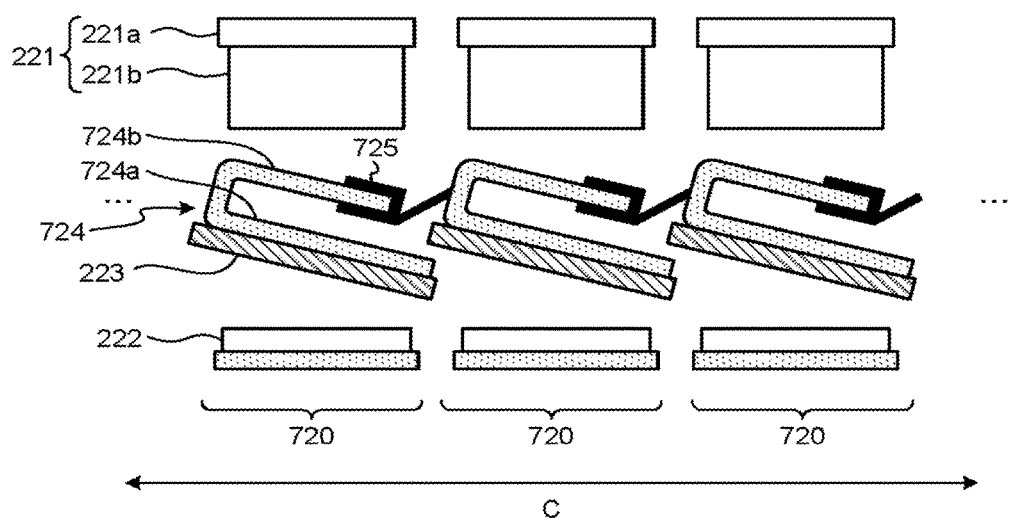
FIG. 19 is a diagram of an exemplary specific configuration of an X-ray detector and a detector module of a first modification of the second embodiment.

FIG. 19 is a diagram of an exemplary specific configuration of a detector and a detector module of a first modification of the second embodiment. For example, as shown in FIG. 19, the supporter 724 shown in FIG. 15 may be arranged upside down.

In this case, in the supporter 724, the X-ray shield 223 is arranged on the surface of a flat part 724a that is arranged on a side opposed to the DAS board 222. Furthermore, the conductive member 725 is attached to a side of the supporter 724 opposite to the bent part in the flat part 724b arranged on a side opposed to the detector pack 221.

Second Modification of Second Embodiment

Figure 20:
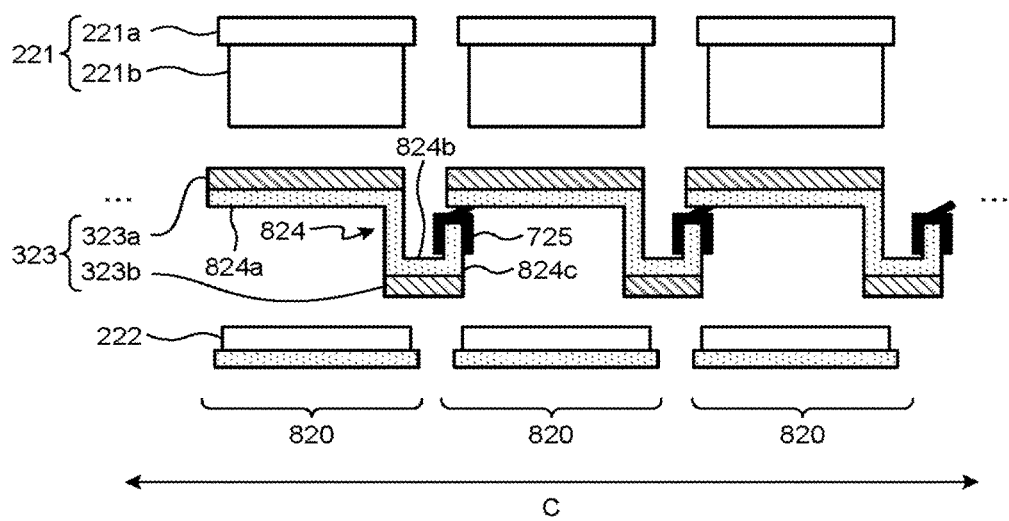
FIG. 20 is a diagram of an exemplary specific configuration of an X-ray detector and a detector module of a second modification of the second embodiment.

FIG. 20 is a diagram of an exemplary specific configuration of an X-ray detector and a detector module of a second modification of the second embodiment. For example, as shown in FIG. 20, when the X-ray shield 323 is divided into the flat-plate member 323a and the flat-plate member 323b and the flat-plate members 323a and 323b are arranged at different levels, a supporter 824 may be formed by performing bending processing on a plate aped member in three areas.

Accordingly, for example, as shown in FIG. 20, in the supporter 824, a flat part 824a on which the flat-plate member 323a is arranged, a flat part 824b on which the flat-plate member 323b is arranged, and an extension part 624c that extends upward from an end of the flat part 824b are formed. For example, the flat part 824b on which the flat-plate member 323b is arranged is formed in a position lower than that of the flat part 824a on which the flat-plate member 323a is arranged. The flat-plate member 323a may be arranged on the top of the flat part 824a as shown in FIG. 20 or may be arranged on the bottom of the flat part 624a. The flat-plate member 323b may be arranged on the bottom of the flat-plate part 824b as shown in FIG. 20 or may be arranged on the top of the flat part 824b.

In this case, for example, the conductive member 725 is provided such that the conductive member 725 protrudes upward from the extension part 824c and such that the protrusion end makes contact with the bottom of the flat-plate part 624a of the adjacently-arranged detector module 820.

According to the above-described the second modification, because bending processing is performed in three areas in the supporter 824, it is possible to improve rigidity of the supporter compared to a case where the supporter 824 is formed in the shape of a single flat plate or a case where bending processing is performed on less than three areas.

Third Modification of Second Embodiment

Figure 21:
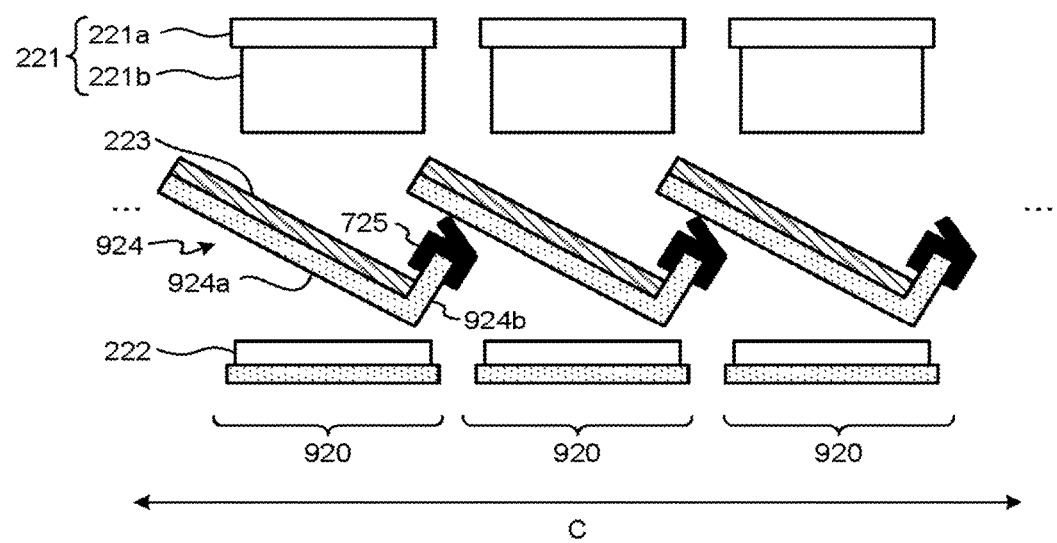
FIG. 21 is a diagram of an exemplary specific configuration of an X-ray detector and a detector module of a third modification of the second embodiment.

FIG. 21 is a diagram of an exemplary specific configuration of an X-ray detector and a detector module of a third modification of the second embodiment. For example, as shown in FIG. 21, when the X-ray shield 223 is arranged obliquely, a supporter 924 may be formed such that the cross-section of the supporter 924 is approximately L-shaped by performing bending processing in one area.

Accordingly, for example, as shown in FIG. 21, in the supporter 924, the flat part 924a on which the X-ray shield 223 is arranged and an extension part 924b that extends upward obliquely from an end of the flat part 924a are formed. The X-ray shield 223 may be arranged on the top of the flat part 924a as shown in FIG. 21 or on the bottom of the flat part 924a.

In this case, for example, the conductive member 725 is provided to protrude from the extension part 924b obliquely upward and such that the end of the protrusion makes contact with the bottom of the flat part 924a of an adjacently-arranged detector module 920.

According to the third modification described above, because bending processing is performed on the supporter 924 in only one area, it is possible to reduce the number of steps and curb the cost of manufacturing the supporter compared to a case where bending processing is performed in two or more areas.

Fourth Modification of Second Embodiment

Figure 22:
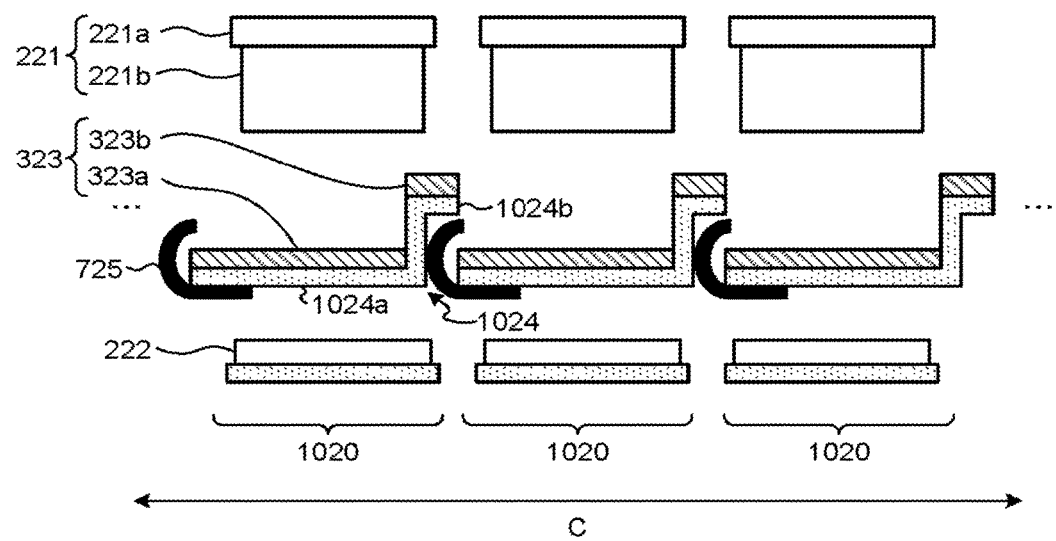
FIG. 22 is a diagram of an exemplary specific configuration of an X-ray detector and a detector module of a fourth modification of the second embodiment.

FIG. 22 is a diagram of an exemplary specific configuration of an X-ray detector and a detector module of a fourth modification of the second embodiment. For example, as shown in FIG. 22, when the X-ray shield 323 is divided into the flat-plate member 323a and the flat-plate member 323b and the flat-plate members 323a and 323b are arranged at different levels, a supporter 1024 may be formed by performing bending processing on a plate-shaped member in two areas.

Accordingly, for example, as shown in FIG. 22, in the supporter 1024, a flat part 1024a on which the flat-plate member 323a is arranged and a flat part 1024b on which the flat-plate member 323b is arranged are formed. For example, the flat part 1024b on which the flat-plate member 323b is arranged is formed in a position higher than that of the flat part 1024a on which the flat-plate member 323a is arranged. The flat-plate member 323a may be arranged on the top of the flat part 1024a as shown in FIG. 22 or may be arranged on the bottom of the flat part 1024a. The flat-plate member 323b may be arranged on the top of the flat part 1024b as shown in FIG. 22 or may be arranged on the bottom of the flat part 1024b.

In this case, for example, the conductive member 725 is provided on a side of the flat part 1024a opposite to the bent part of the flat part 1024a. For example, the conductive member 725 is provided to protrude from the side toward the outside of the supporter 1024 and such that the end of the protrusion makes contact with the bent part of an adjacently-arranged detector module 1020.

According to the fourth modification described above, because the conductive member 725 is provided to protrude toward the outside of the supporter 1024, it is possible to reduce the thickness of the supporter compared to a case where the conductive member is provided upward or downward.

The supporters 824, 924, and 1024 described with respect to the second to fourth modifications described above may be arranged upside down as in the first modification.

The second embodiment and modifications thereof have been described. According to the second embodiment and modifications described above, as in the first embodiment, it is possible to replace a detector pack easily and prevent radiation from being directly incident on a structure that is arranged on an outer side with respect to the detector packs in a direction in which radiation is emit ed. Furthermore, according to the second embodiment and modifications thereof described above, it is possible to curb effects of noise on, for example, an electric board.

Furthermore, according to the second embodiment and modifications thereof, because the supporter is formed by performing bending processing on a plate-shaped member, it is possible to manufacture the supporter in light weight and at low cost.

The shapes of the supporter and the conductive member described with respect to the second embodiment and modifications thereof are not necessarily limited to those illustrated in FIGS. 15 to 22. Conductive members in various shapes may be used as long as they enable the above-described functions.

For example, the example shown in FIGS. 15 to 22 exemplify the case where the flat part on which the X-ray shield is arranged has a size approximately same as that of the X-ray shield; however, the second embodiment is not limited to this. For example, as described with respect to the first embodiment, X-ray shields are arranged to overlap; however, they do not necessarily overlap as long as the space between supporters is filled with a conductive member.

Furthermore, for example, in the examples illustrated in FIGS. 15 to 22, the supporter is formed by performing bending processing on a single member having the shape of a flat plate; however, the second embodiment is not limited to this. For example, when the supporter 724 is formed to have a double-layer structure including the flat parts 724a and 724b as shown in FIGS. 15 and 19, the flat parts 724a and 724b are not necessarily continuous. For example, the supporter 724 may be formed by arranging the flat parts 724a and 724b each formed independently in two layers. In this case, the apace between the flat parts 724b of detector modules 720 adjacent to each other is made conductive with the conductive member 725.

The first and second embodiments and each modification thereof have been described. The first and second embodiments and each modification thereof exemplify the case where the X-ray shield and the supporter are independent of each other; however, the embodiments are not limited to this. For example, by using a material having relatively high rigidity, such as tungsten or molybdenum, the X-ray shield and the supporter may be formed uniformly. For example, part of or whole the supporter is formed of a material having high rigidity and the supporter is arranged such that the part formed of the material is used as an X-ray shield.

Furthermore, descriptions have been provided on the first and second embodiments and each modification thereof in which the technology disclosed herein is applied to an X-ray CT apparatus; however, the embodiments are not limited to this. For example, it is possible to apply the technology disclosed herein in the same manner to other medical image diagnosis apparatuses each including a radiation detector for detecting radiation. "Other medical image processing apparatus" include, for example, a PET apparatus, a SPECT apparatus, and a gamma camera.

According to at least one of the embodiments described above, it is possible to replace a detector pack easily and prevent radiation from being directly incident on a structure that is arranged on an outer side with respect to the detector packs in a direction in which radiation is emitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation detector comprising:
    a plurality of detector modules that are arranged along a given direction and each of which includes a detector pack including a detection element configured to detect radiation;
    a first radiation shield that is provided in a first detector module among the detector modules and that is arranged on a side opposite to a surface of a first detector pack of the first detector module on which the radiation is incident;
    a second radiation shield that is arranged to intersect with a path of radiation that passes through between the first detector pack and a second detector pack of a second detector module that is arranged adjacently to the first detector module; and
    a first supporter that is provided in the first detector module and that is configured to support the first radiation shield such that at least a part of the first radiation shield overlaps the second radiation shield on the path of radiation.

2. The radiation detector according to claim 1, further comprising:
    a second supporter configured to support the second radiation shield,
    wherein
    the second radiation shield is provided in the second detector module and is arranged on a side opposite to a surface of the second detector pack on which the radiation is incident,
    the second supporter is provided in the second detector module and is configured to support the second radiation shield such that at least a part of the second radiation shield overlaps the first radiation shield on the path of radiation, and
    the first detector module and the second detector module have the same configuration.

3. The radiation detector according to claim 2, wherein the first supporter is configured to support the first radiation shield such that at least one end of the first radiation shield in the given direction extends to an outer side with respect to an end of the detector pack.

4. The radiation detector according to claim 2, wherein the first supporter is configured to support the first radiation shield such that one end of the first radiation shield and the other end of the first radiation shield in the given direction are arranged in different positions along a direction in which the radiation is emitted.

5. The radiation detector according to claim 2, further comprising a conductive member that is provided to protrude from the first supporter, wherein the end of the protrusion makes contact with the second supporter and accordingly the conductive member is arranged in a gap between the first supporter and the second supporter.

6. The radiation detector according to claim 1, wherein the second radiation shield is arranged to run along the first detector module and the second detector module on an outer side with respect to the first detector module and the second detector module in the direction in which the radiation is emitted.

7. The radiation detector according to claim 1, wherein the detector modules are configured to be replaceable individually.

8. A medical image diagnosis apparatus comprising:
    a radiation detector configured to detect radiation that is transmitted through a subject; and
    an image generation unit configured to generate an image of the subject on the basis of the radiation that is detected by the radiation detector, wherein
    the radiation detector comprises:
    a plurality of detector modules that are arranged along a given direction and each of which includes a detector pack including a detection element configured to detect the radiation;
    a first radiation shield that is provided in a first detector modules among the detector modules and the is arranged on a side opposite to a surface of a first detector pack of the first detector module on which the radiation is incident;
    a second radiation shield that is arranged to intersect with a path of radiation that passes through between the first detector pack and a second detector pack of a second detector module that is arranged adjacently to the first detector module; and a first supporter that is provided in the first detector module and that is configured to support the first radiation shield such that at least a part of the first radiation shield overlaps the second radiation shield on the path of radiation.

\* \* \* \* \*